United States Patent [19]

Bruner

[11] 4,228,741
[45] Oct. 21, 1980

[54] AUTOMATICALLY RELEASING STABILIZER

[75] Inventor: Frank D. Bruner, Omaha, Nebr.

[73] Assignee: Paxton & Vierling Steel Co., Omaha, Nebr.

[21] Appl. No.: 863,395

[22] Filed: Dec. 22, 1977

[51] Int. Cl.$^2$ .................. B61F 3/08; B61F 5/06; B61F 5/14; B61F 5/24
[52] U.S. Cl. .................. 105/197 D; 105/175 A; 105/182 R; 105/199 CB; 105/199 R
[58] Field of Search ........ 105/199 R, 199 C, 199 CB, 105/197 R, 200, 201, 197 D, 197 R, 174, 175 A, 182 R

[56] References Cited

U.S. PATENT DOCUMENTS

| | | | |
|---|---|---|---|
| 308,776 | 12/1884 | Lane | 105/199 R |
| 516,935 | 3/1894 | Kling | 105/199 R |
| 690,330 | 12/1901 | Timmis | 105/199 R |
| 1,408,371 | 2/1922 | Linton | 105/201 X |
| 2,040,262 | 5/1936 | Kruckenberg et al. | 105/201 |
| 2,111,428 | 3/1938 | Kjolseth | 105/199 R X |
| 2,227,140 | 12/1940 | Kjolseth | 105/199 CB |
| 2,676,550 | 4/1954 | Burdick | 105/199 R |
| 3,376,831 | 4/1968 | Eaton et al. | 105/197 D |
| 3,376,958 | 4/1968 | Carr | 105/174 X |
| 3,443,528 | 5/1969 | Lipsius et al. | 105/199 R |
| 3,731,638 | 5/1973 | Tack | 105/199 CB |
| 3,865,045 | 2/1975 | Jones, Jr. | 105/199 C |

FOREIGN PATENT DOCUMENTS

| | | | |
|---|---|---|---|
| 243624 | 12/1925 | United Kingdom | 105/199 CB |
| 574817 | 1/1946 | United Kingdom | 105/200 |
| 541708 | 3/1977 | U.S.S.R. | 105/199 CB |

*Primary Examiner*—John J. Love
*Assistant Examiner*—Howard Beltran
*Attorney, Agent, or Firm*—Hume, Clement, Brinks, Willian & Olds, Ltd.

[57] ABSTRACT

A stabilizer for providing railway car wheel-truck anti-hunting stabilization with automatic stabilizer releasing at rail curves. This stabilizer comprises first and second anchors attachable respectively to the car body and truck, the stabilizer having an intermediate section having a movement preventing module preventing destructive truck hunting movement of the anchors with respect to each other in at least one direction during straight track travel, but permitting the anchors to freely move with respect to each other when the truck reaches a section of curved track.

15 Claims, 17 Drawing Figures

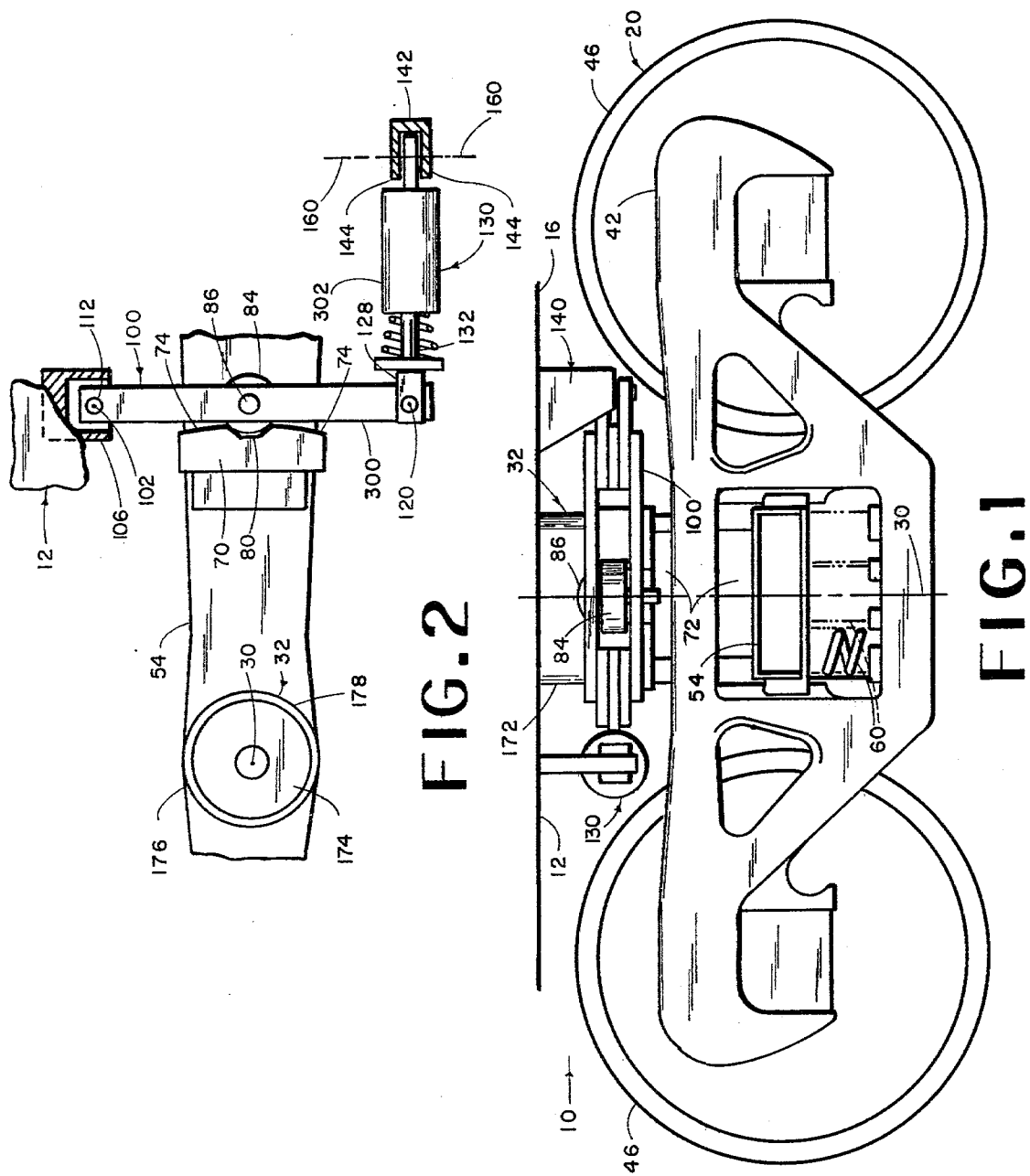

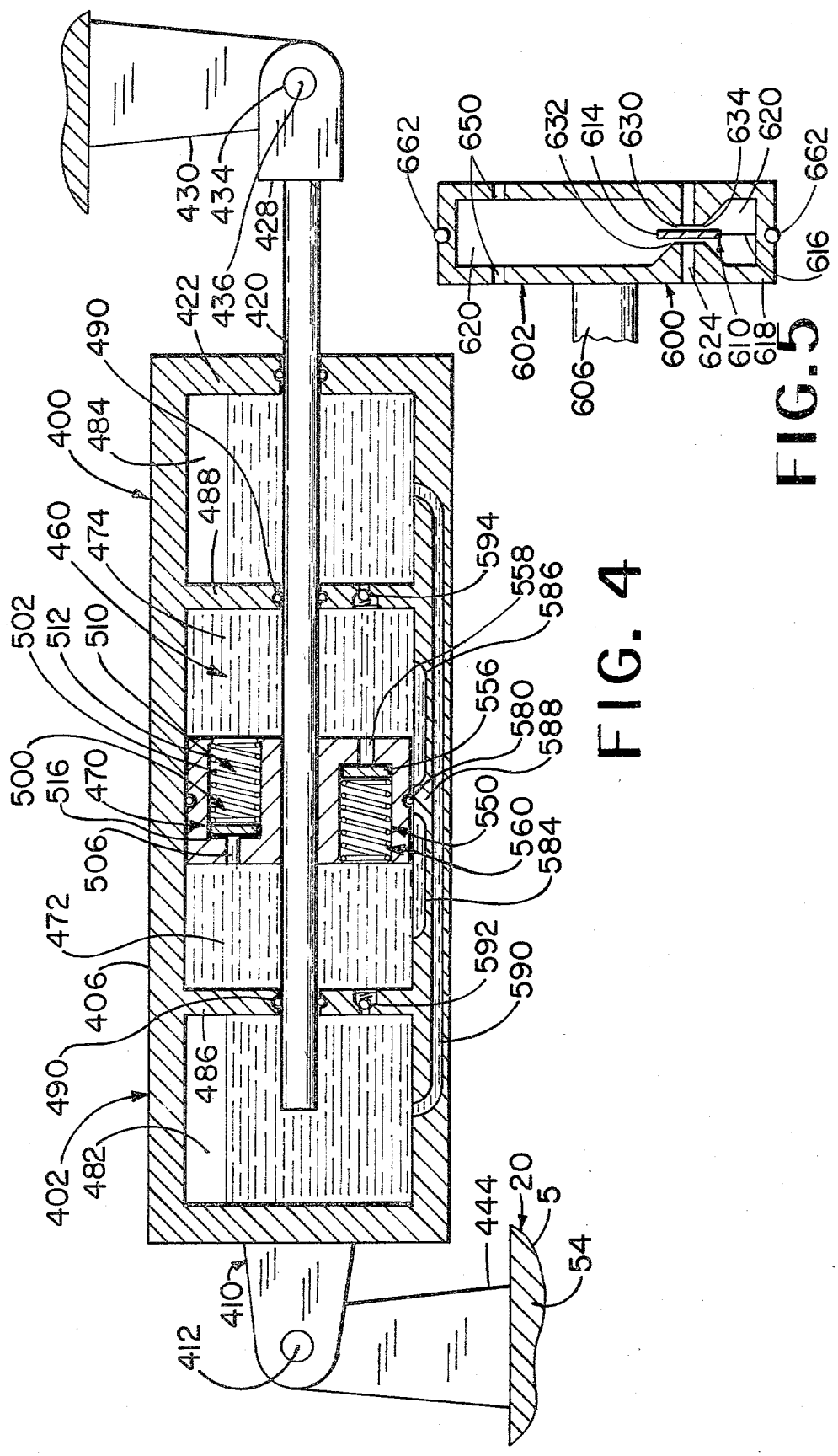

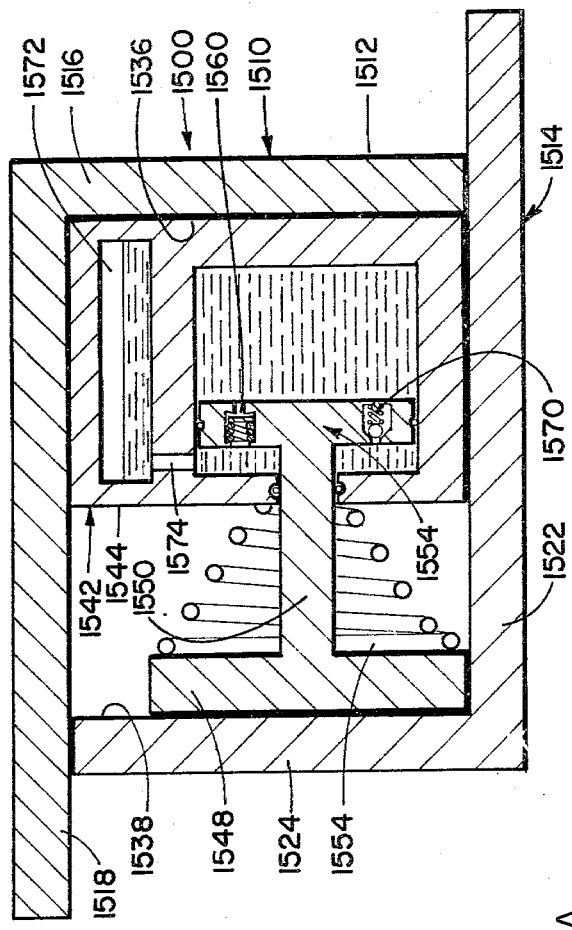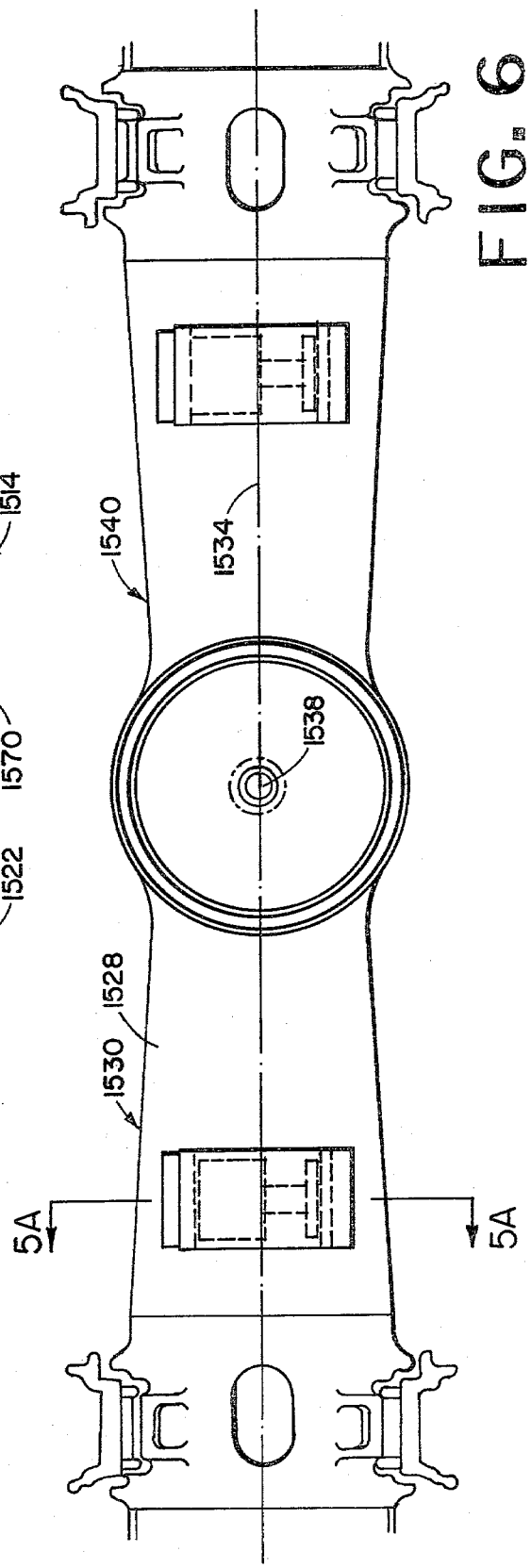

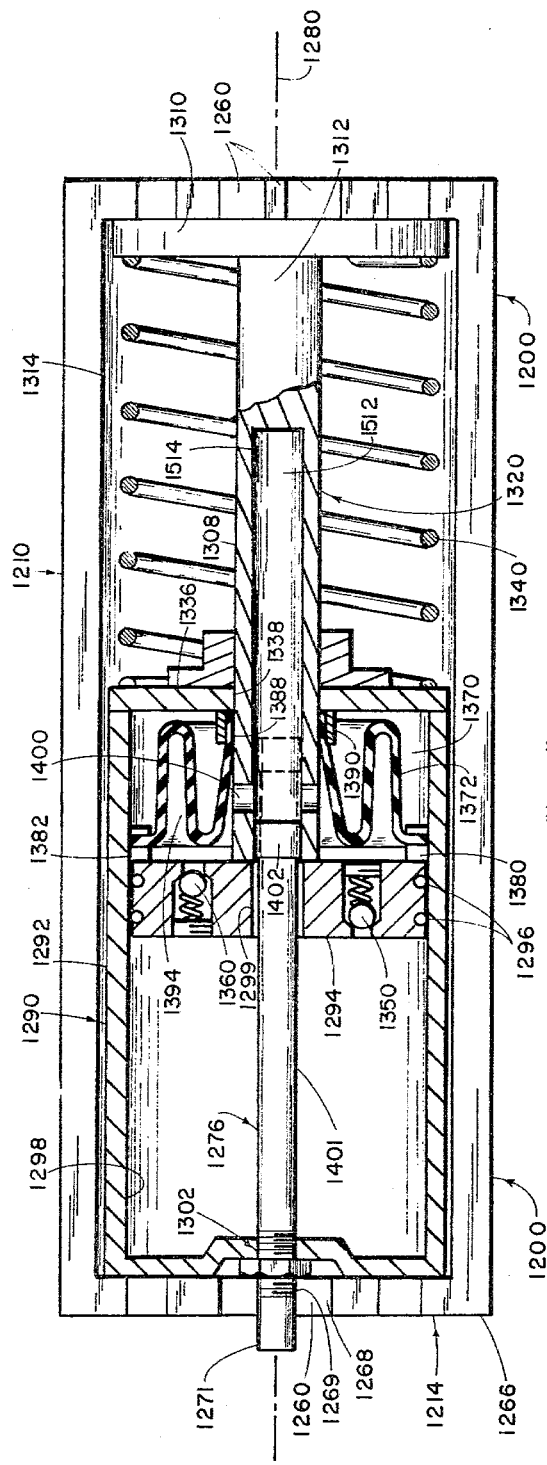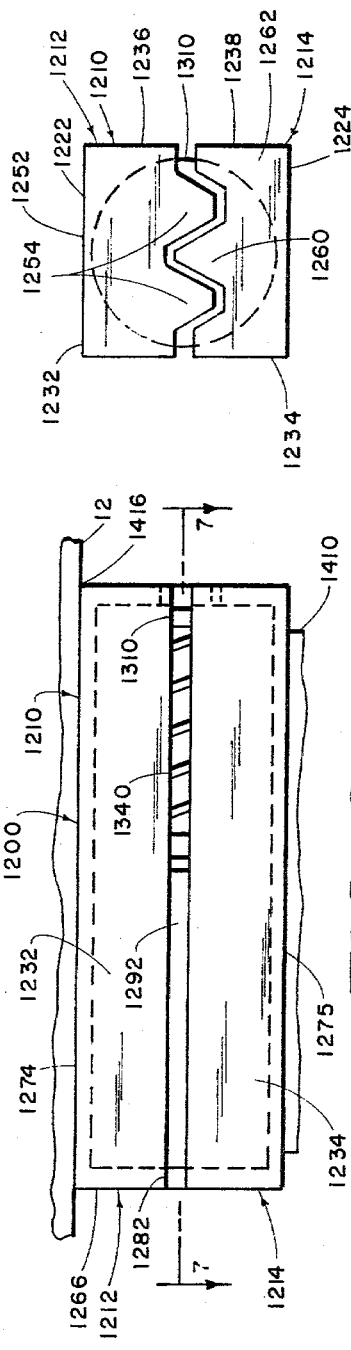
FIG. 7
FIG. 9
FIG. 8

AUTOMATICALLY RELEASING STABILIZER

BACKGROUND OF THE INVENTION

The tendency for wheel trucks on railway cars to move from side to side while traveling on straight track is called "truck hunting" and has long been known to place such stress on the wheel tread and flanges as to cause accelerated failure to wheels and also to truck components along with damage to track structure. This causes higher maintainance costs and also extreme costs when derailments occur as a result of "truck hunting".

In 1893 a patent was issued on the use of pendulums to resist this movement, so as to attempt to hold the axle of the wheel-truck at a right angle to the line of draft during straight track travel. However, the pendulums would also cause such resistance at the time the wheels came to a curve section as to put excessive strain on the wheels during the curve section travel.

As the years went by coil spring systems were used for the same purpose as the pendulums and then later leaf springs were proposed in a patent issuing in 1925. But the leaf and coil springs had the same disadvantage as the pendulums, namely, they placed undue stress and wear on the wheels as the wheels rounded the curves.

There was even a problem that the more the curve, the more the stress because the pendulums would be farther from vertical thus exerting greater force or the springs would be farther from normal position and exerting greater force. As a result wheels could fail from the stress applied on them at the curve, even though the springs could provide help in relieving stress on the straight track section.

By 1938 it was recognized that a releasing of pressure was desirable so that the wheel-trucks could turn freely on a curved track section, but the proposal for accomplishing this utilized springs and cam surfaces. Cam surfaces, however, cannot provide a sudden and an abrupt and an immediately operative freeing of a stabilizer.

Since 1938 many proposals have been made for the multiplying of forces by hydraulics so that a spring in a check valve can be used as the force to restrain a truck.

My basic concept in its referred embodiment involves the use of a hydraulic cylinder assembly having an openable by-pass passageway, the assembly being mounted with its ends directly, or indirectly, connected to the car body and truck respectively. The length of the cylinder assembly is hydraulically locked so as to prevent oscillation of the truck during straight track travel, by having the by-pass passageway blocked, by the piston or by another type of blocking member such as a moving valve member, during straight track travel, the passageway becoming opened at a time when the truck has reached a curve because of the position that the piston or other blocking member is placed in by the wheel-truck when the wheel-truck is rotated by the curved track.

This uncovering of the passageway makes possible the release of the hydraulic locking, the release being abrupt and full so that the wheel-truck can then take the curve freely without the oscillation resistance system of this invention interferring with swiveling of the wheel-truck.

With my concept there would be no pressure forcing the wheels against the rails during curved track travel, thereby eliminating and wear and stress on the wheels which would otherwise occur if my releasing feature is not used.

My concept further involves the advantage that when the wheel-truck reaches a straight track section again, then the piston will have been caused to reach a position in the cylinder housing for covering up and closing off the passage way means again, so that the hydraulic pressure for controlling oscillation is once more in effect.

In some applications, the automatically releasing stabilizer of my invention may be advantageously combined with a cam surface in order to further increase control over truck position during straight track travel. The cam surface used in this application is contoured to cause wheel truck rotation encountered during straight track travel to induce greater piston travel than wheel truck rotation encountered during curved track travel.

A position I prefer for the check valves, is in the piston itself, there being two check valves, one to stop flow in each direction of truck motion during oscillation.

A further object of this invention is to provide in the combination a feature of hydraulic engineering used some in other fields, but not used in anti-hunting devices to my knowledge.

This feature is means for compensating for the fact that in a simple hydraulic cylinder the piston rod is ordinarily reducing the volume in the housing on one side of the piston; whereas, ordinarily, there is no piston rod on the other side of the piston to provide a balancing reduction of the amount of fluid occupying the housing portion on the other side of the piston. This compensation can be accomplished in various ways. One such way is the use of a bellows or flexible sealing device.

When cars are run empty or with light load, this truck hunting may become a very serious problem. Experiments and data taken on many truck hunting tests have developed that trucks on empty cars may start hunting at speeds less than 40 MPH. Other cars can run at higher speed, but it appears that many cars begin to have serious problems with truck hunting when speeds exceed 55 to 60 MPH. Some can reach 70 to 80 MPH with no serious problem, but hunting of a lesser degree is still prevalent.

Loaded cars tend to be less susceptible to truck hunting due to higher friction force at the truck center plate and casting. When this frictional force exceeds the force of the rail to wheel adhesion, the truck tends to stay centered and steer down the rail.

Numerous tests have been made throughout the past several years, and it has been determined that a significant amount of hunting occurs at a side to side or rotational frequency of approximately 3 cycles per second.

The frequency depends upon many variables. However, any hunting in this frequency range is detrimental to equipment from a wear and fatigue standpoint.

Excessive wheel flange and tread wear, wear on truck pedestal liners, bolster gibs, bearing adapters, and brake suspensions and also center casting wear may be accelerated by truck hunting.

Along with this, the car body is flexed and twisted with each hunting cycle, which may cause accelerated fatigue fractures in side sheets.

Of prime importance is the danger of derailment when truck hunting is accompanied by rock and roll and the wheel lifts over the rail—which has been suspect in many derailments.

Many railroads have placed speed restrictions on certain cars because of truck hunting which has been thought to create derailment problems. This may cause a serious problem in over-all railroad operation and train and car scheduling, making it necessary to restrict train speed on many trains.

The industry is quite aware of these problems and has expended large sums of money in testing, designing and retesting schemes which include new design trucks, and numerous frictional side bearing arrangements to add frictional forces to the center casting or change the suspension to allow wheel movement without truck movements. Several new trucks have been designed and tested. Some have had a marginal degree of success which appears to parallel the amount of money the suppliers or industry want to spend for these fixes.

The system proposed in this invention is to retard the truck rotational movement in a limited arc, then allow free truck movement thereafter in order to afford free movement to negotiate curves, turn-outs, and cross-overs. Truck hunting is attenuated through curves due to reduced speeds for curve restrictions and because centrifugal forces tend to hold the wheel flanges against the rail through the curve.

In the prior art many patents utilized heavy springs to damp ascillation as described, I do use a spring for the purpose of causing the piston to return to a normal position for straight track travel, but such a spring need not be heavy since the main work of damping the truck oscillation is being done through the hydraulic system of this invention.

A special objective of this invention is to provide the concept of using a roller and a roller receiving notch assembly with the roller mounted either on the truck or on the car body, and with the notch mounted on the other of the truck or car body and with the roller held in place, either by a piston rod, or by a lever connected to a piston rod of a hydraulic anti-hunting assembly, the roller and notch system providing a means of making a single acting hydraulic cylinder to damp or lock the pivoting of the truck in either direction with the roller being permitted to climb out of the notch as the truck turns either clockwise or counterclockwise.

An object of the invention is to provide a hydraulic stabilizer system, using a hydraulic cylinder with a restricted motion control port capable of resisting hunting, yet permitting lesser oscillations of the harmless sort, and for permitting a wheel-truck to round very gradual curves without substantial resistance. That is curves which are so gradual that they would not move the piston into a position for releasing fluid into a by-pass line extending from a portion of the cylinder wall, which is on one end thereof and, therefore, one one side of the piston, to a portion of the cylinder wall which is on the other end thereof, and, therefore, on the other side of the piston. I call such a stabilizer a single acting stabilizer with motion control port. Such a stabilizer can work effectively with the roller and notch system above described, provided its piston has a return flow check valve, permitting fluid to flow back to the right side of the piston when the return spring is moving the roller back into its notch.

Another object of the invention is to provide a double acting cylinder wheel-truck stabilizer, the ends of which are attached directly to the wheel truck and the car body, and the piston of which is provided with pressure check valves permitting flow therethrough from left to right and right to left, respectively, but only when the wheel-truck has reached a curve. This is because the springs of the check valves are intentionally sufficiently strong as to substantially prevent oscillation of the wheel-truck.

A further object is to provide the concept of a velocity sensitive valve stabilizer, the piston of which has a velocity sensitive valve mounted therein permitting flow around the valve freely, so long as the flow is slow, but when the flow reaches a higher velocity, such as the velocities that result from truck hunting, the valve will close for preventing truck hunting.

A further object of the invention is to provide a single acting stabilizer with squeeze frame, which comprises a hydraulic cylinder with a piston having a pressure check valve in it of sufficient strength as to resist truck hunting and yet being overcomable for permitting the rounding of curves, the piston having a return flow check valve in it, and the piston being urged into normal position by a compression spring, the frame of the stabilizer of this modification having a truck mounted part and a body mounted part mounted in positions such that when the truck attempts to turn about is vertical axis in one direction, the cylinder assembly will be squeezed or placed under compression. Two stabilizers of this modification are used, one on the left and one of the right side of the wheel-truck for taking care of clockwise and counter-clockwise pivoting, respectively.

Still another object of this invention is to provide a box type stabilizer modification in which a hydraulic cylinder is nested between the upper and lower halves of a box frame, the top part of a box frame being fixed to the underside of a railway car, and the underside of a box frame is attached to the wheel-truck. The box frame sections move with respect to each other in one direction as the wheel-truck pivots clockwise, and in another direction as the wheel-truck pivots counter-clockwise, and in either of these wheel truck movements the hydraulic cylinder of this modification is under compression forces. The piston in this modification is provided with a pressure check valve overcomable only during wheel-truck rounding of a section of curve track, but capable of resisting truck hunting oscillations, the piston having a return flow valve, permitting flow therethrough. When the truck enters a curve with this modification, the flow passing through the piston pressure check valve is accommodated by a diaphragm for keeping the fluid between the diaphragm and the piston, a spring returning the parts of this hydraulic cylinder modification to original position, and a by-pass passage in this modification coming open only when compression of the hydraulic cylinder assembly is sufficient as to be proportional to the need for the truck to round a curve in the track which it then does without resistance, because of free flow through the by-pass passage.

Still another object is to provide a vertically moving stabilizer modification in which a hydraulic cylinder assembly and return spring are mounted to cooperate with a vertically moving roller which is received normally in a notch of an element mounted either on the wheel-truck or railway car with the hydraulic cylinder and roller being mounted on the opposite one of the wheel-truck and railway car, with the hydraulic cylinder preferably mounted in the truck. A single acting hydraulic cylinder is sufficient for this use and can have a truck motion control port extending through the piston, permitting harmless oscillations below the damaging truck hunting frequencies, the piston having a return flow valve, and the cylinder having by-pass passage means, which can be grooves in a wall thereof, positioned to release fluid for free flow from one side of the piston to the other at times when the piston has moved from normal straight track travel position sufficiently to indicate that the truck is beginning to round a curve, so that the roller must come completely out of its notch.

Still another modification of the invention is the cam-leaf-spring modification, which provides a stabilizer utilizing a lever pivoting on a railway car mounted fulcrum, and having a roller at one end normally received in a notch in a radius element attached to the wheel-truck, the other end of the lever having a spring engaging roller engageable with the leaf spring fixed to the railway car. The leaf spring having an offset portion adapted to receive the spring engaging roller, the offset portion being farther from the fulcrum of the lever so that when a truck enters a curve the roller can climb out of its notch with greater ease because the spring engaging roller can pass over on to the offset portion of the leaf spring, whereby lesser pressure is applied by the spring for holding the notch roller in place. When the wheel-truck again comes to a straight track section out of a curved track section the spring engaging roller will climb a gradually inclined surface on the spring back on to a main part of the spring, so that the spring applies pressure for holding the notch roller in its notch to resist wheel-truck oscillation during straight track travel, with sufficient force as to substantially prevent all truck hunting oscillations of the equipment damaging type.

It is common for railroad tracks to have gradually increasing curvature along a substantial length of track as the track extends from a straight track section toward a curved track section. This is somewhat different from many automobile super highways in which the curvature is on a radius immediately as it leaves the straight track section.

When the only way of releasing the hydraulic pressure in a wheel-truck stabilizer is by a prior art method of a by-pass line from one end of the cylinder to the other, which passes through a pressure check valve, then the spring of that valve will cause a hydraulically multiplied force, resisting the increasing degrees of turning of the wheel-truck, wearing away the flanges of the wheel-truck against the rails.

The hydraulic stabilizers of this invention can be adjusted, for example, to resist only amounts of wheel-truck turning which are the equivalent of a one and a half degree rail curvature, so as to prevent hunting. Many rail curvatures extend as high as fifteen and even twenty degrees, with approximately eight degrees being the average curve in the United States, as a guess, in my opinion. Therefore, since most rail curves in the United States are in excess of a one and a half degree curvature the hydraulic stabilizers of this invention will reduce stabilizer-caused wheel flange wear and rail wear along the vast majority of the degrees of curvature traveled by the many railroad cars in the country.

SUMMARY OF THE INVENTION

The main purpose of this invention is to provide a stabilizer for providing stabilization with automatic stabilizer releasing and useful for providing railway car wheel-truck anti-hunting stabilization with automatic stabilizer releasing at rail curves, the stabilizer comprising first and second anchors attachable respectively to the car body and the truck, the stabilizer having an intermediate section having a movement stopping module substantially preventing movement of the anchors with respect to each other in at least one direction and useful on railway cars to prevent destructive truck-hunting during straight track travel, but permitting the anchors to freely move with respect to each other when the corce on the anchors is greater, such as on a railway car when the truck enters a curved track section, the stabilizer movement-stopping module having a pair of cooperative anchors release-controlling parts which initiate substantial release of the anchors when the release-controlling parts are in releasing positions with respect to each other, but maintaining the stabilizer in a stabilizing condition whenever the release controlling parts are in non-releasing positions with respect to each other, the release-controlling parts being an entrance to a by-pass passage way interconnecting parts of a hydraulic cylinder disposed respectively on opposite sides of its piston, and a blocking and unblocking the entrance, the blocking member being the edge of the piston, or in another modification a moving valve disc.

The releasing parts can comprise a by-pass line used in the hydraulic stabilizer for rendering inoperative hydraulic stabilization of the truck when the by-pass line is unblocked, and a by-pass line blocking member, which latter can be the piston of a hydraulic cylinder assembly of the stabilizer, adapted to block the by-pass line to prevent release of stabilization for straight track travel.

The two releasing parts of the stabilizer, in another modification, can be portions of a leaf spring, cooperative with a spring engaging roller in which an offset part of the spring functions as a stabilization releasing part while the roller that engages the spring functions in this modification as the cooperative part of the stabilization releasing pair of parts, as a result of its connection to the wheel-truck by means of a notch in a radius element on the wheel-truck and a notch engaging roller connected to the spring engaging roller by a suitable means such as a lever pivoting on a fulcrum mounted on the underside of a railway car body.

The resistance needed for stabilization is provided in the modifications of this invention, either by hydraulic fluid motion resisted by one or more pressure check valves, having a total spring capacity for preventing fluid flow during straight track travel, sufficient for preventing truck hunting, or the resistance can be provided by a motion control port of a restricted size permitting only fluid motion therethrough, such as would allow only truck oscillations of frequencies in the relatively harmless range below the damaging truck hunting frequencies but resisting the faster flow therethrough that would be necessary for truck hunting movements, or the hunting resistance can be provided by the pressure of a spring pressing against a roller, in which the roller is moveable in response to the rounding of a rail curve by the truck into a position on a cam element such that the spring pressure is greatly relaxed so that the truck can round the curve with much lesser resistance from the spring of the stabilizer.

BRIEF DESCRIPTION OF THE DRAWINGS

FIG. 1 is a side elevation of a wheel-truck shown as attached to a railway car, only a small portion of the underside of the railway car showing, with the wheel-truck being diagrammatically and incompletely shown, for convenience of illustration, with the positions of springs being partially indicated in dotted and partially in full line form, the stabilizer which is shown in FIG. 1 being of a hydraulic type, using a notch and roller with lever assembly.

FIG. 2 is a top plan view of parts of a bolster portion of a wheel-truck of FIG. 1, portions of the railway car with parts connected thereto partially broken away and showing in section, the view in FIG. 2 being taken from the top in FIG. 1, but rotated 90° counter-clockwise for the purpose of fitting on to the drawing sheet.

FIG. 4 is a side elevation of a stabilizer modification of the double acting cylinder type of this invention, showing a hydraulic cylinder with its ends connected to a portion of a wheel-truck and a portion of a railway car, respectively, closer half portions of the hydraulic cylinder housing and pistons thereof being broken away and the remainder showing in section for illustrating interior construction, the parts being in a position for straight track travel, and for locking the truck against hunting.

FIG. 5 is a side elevation of a special piston for velocity sensitive valve stabilizer with a closer half of the piston frame being broken away for showing the remainder thereof in section, revealing the velocity sensitive valve shown in full lines and half of the motion control port thereof.

FIG. 5A is a side elevation of a stabilizer modification, utilizing a squeezing frame, having a body mounted upper part and a truck mounted lower part, prepared to squeeze therebetween a hydraulic cylinder assembly of a single acting nature, using a single pressure check valve for permitting only truck movement for rail curves and a return flow check valve, the stabilizer using a weak return spring, all parts being shown in section because the forward half portion of the stabilizer of FIG. 5A is removed whereby the parts are substantially as would be seen along the line 5A—5A of FIG. 6, the parts in FIG. 5A being shown in straight track travel position.

FIG. 6 is a top plan view of a bolster portion of the wheel-truck of FIGS. 1 and 3, but with the stabilizer modification of FIG. 5A mounted thereon on the left hand side, and again on the right hand side for controlling clockwise and counter-clockwise truck pivoting, respectively, interior parts of the stabilizers shown in FIG. 6 being shown in dotted lines.

FIG. 7 is a top plan view of a sectional box frame type of stabilizer modification of this invention, with the top section of the box frame removed and with the upper half of a hydraulic cylinder housing and of a piston being removed and the remainder showing in section, and also with the upper half of a diaphragm and the upper half of a portion of a valve shaft receiving sleeve being removed and with the remainder showing in section.

FIG. 8 is a side elevation of the stabilizer of FIG. 7, as would be seen from the side of a rail car during straight track travel, portions of the railway car and of the truck attached thereto being shown to a limited extent.

FIG. 9 is a right end elevation of the stabilizer of FIG. 8.

DESCRIPTION OF THE PREFERRED EMBODIMENTS

Figure 3:
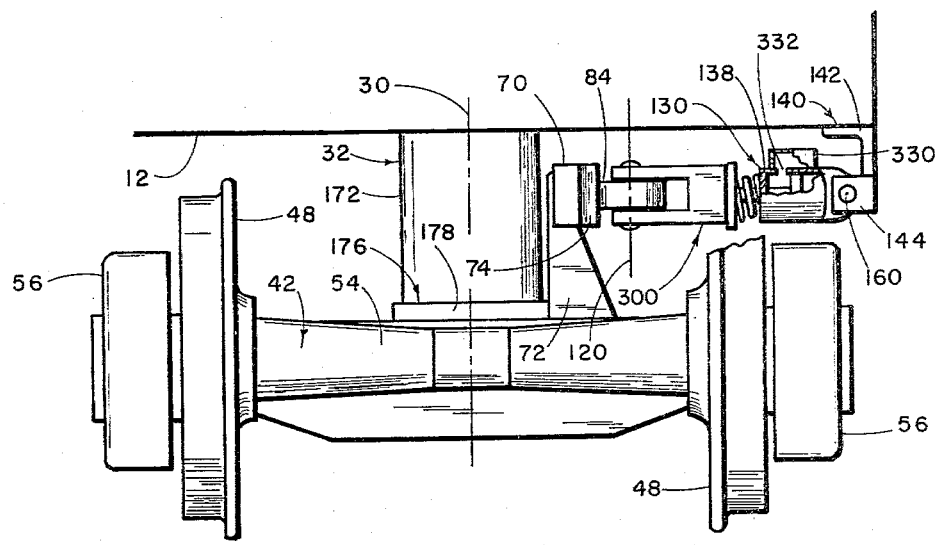
FIG. 3 is a frontal elevation of the wheel-truck and stabilizer assembly of FIG. 1, shown with the small part of the bottom portion of a railway car thereabove. The parts in FIG. 3 being shown in a position for straight track travel as they are also in FIGS. 1 and 2.

A railway car and stabilizer assembly of this invention is generally indicated at 10 in FIG. 1 and comprises a railway car body, generally indicated at 12, having an underside surface 16, to which a wheel truck, generally indicated at 20, is secured for pivoting about a vertical axis 30 by means of a pivot assembly 32 of any conventional nature, upheld by a frame 42 of the truck 20 on which four wheels are mounted, as shown at 46, the wheels comprising two forward wheels and two rearward wheels, as is conventional on wheel-trucks.

Each wheel 46 is provided with a vertically projecting circumferential flange 48 on its side nearest the axis 30 for holding each wheel on a rail, not shown.

The frame 42 has a transverse bolster 54 extending from right to left under the axis 30, the bolster 54 being slidably attached in any suitable manner to right and left wheel bearing carriers 56 which form parts of the truck frame. The bolster 54 is suspended on springs only diagrammatically shown partially in full and dotted lines at 60 in FIG. 1, the spring 60 being between the bolster 54 and the right and left wheel carriers 56.

All of the above described wheel-truck parts are conventional.

In accordance with this invention a cam element 70 is secured at 72 to the upper side of the bolster 54, as best seen in FIG. 3, and the cam element 70 has a roller-engageable cam surface 74 on the side thereof facing away from the axis 30, as best seen in FIG. 2. The surface 74 is on an arc concentric with the axis 30, or on a radius, which can be imagined as extending outwardly from the axis 30 horizontally. The surface 34 is preferably vertical, except that it is curved, as described and as best seen in FIG. 2 in top plan view.

So far we have described the general shape of the surface 74, but it has at its center a notch 80 disposed midway between forward and rearward wheels 46 of the truck 20.

The notch 80 is for the purpose of receiving a cam follower such as a roller 84 which rotates on a roller carrier 86, which connects the roller 84 to a lever 100, as best seen in FIG. 2.

The lever 100 has a car body attached to it at 102 by means of a pivot assembly 106 to the car body 12, a portion of which latter is seen in FIG. 2.

The pivot attachment 106 provides for the pivoting of the lever 100 about a vertical axis, herewith called a second axis 112, as seen in FIG. 2.

The lever 100 extends from the axis 112 past the roller 84 a substantial distance to a pivot axis 120, at which the lever 100 is connected by a clevis pivot assembly 128 to one end of a hydraulic cylinder assembly 130, such as to the piston rod 132 of the latter.

In FIG. 2, it can be seen that the hydraulic cylinder assembly 130 has a cylinder housing 138, which latter is pivotally connected to the car body 16 by a cylinder body connection assembly, generally indicated at 140, and best seen in FIGS. 2 and 3, which comprises a bracket 142 connected to the body 16 and attached to clevis members 144 which are connected to the cylinder housing 138 for rotation of the cylinder housing 138 about a cylinder assembly body connection axis 160 which extends horizontally at a tangent to an imaginary circle having a center at the truck axles 30, such circle being in a horizontal plane.

In FIGS. 2 and 3, the torque pivot assembly 32 can be seen to be conventional having a column 172 attached to and extending downwardly from the railway car body 12 and having a horizontal undersurface, not shown, received against a horizontal upper inner surface 174 of a bolster cup 176, which latter is fixed to the top of the bolster 54 and has a flange 178 surrounding and containing the lower end of the column 172 for rotation with respect thereto in a conventional manner.

Figure 3A:
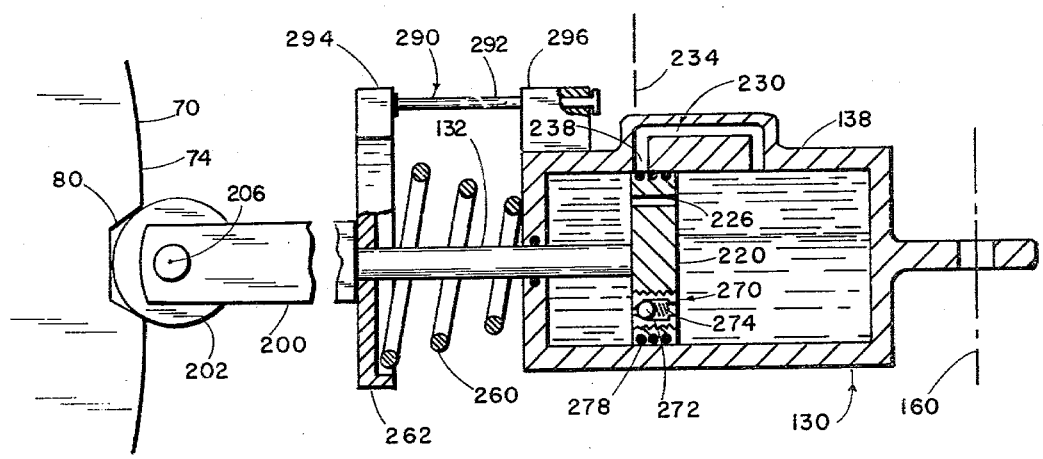
FIG. 3A is a side view of a modified stabilizer having a single acting hydraulic cylinder, a motion control port and a by-pass passage for hydraulic release for curved track travel, this modification utilizing a notched radius element, as in FIG. 2, but with the roller directly connected to the piston rod, closer half portions of a hydraulic cylinder housing and of the return spring flange being broken away and the remainder showing in section, and portions of the piston being broken away for showing parts in section.

The hydraulic cylinder assembly 130 of FIG. 3 can be best understood by referring to FIG. 3A in which the assembly is shown partially in section, although the FIG. 3A is also used for the purpose of illustrating a modification in which the same hydraulic cylinder assembly 130 can be used by attaching its piston rod, not to the clevis assembly 128 for attachment to the lever 100 of FIG. 2, but instead, the piston 132 in FIG. 3A is attached directly to a special clevis 200, which carries a roller 202 identical to the roller 84 and rotating about the roller axis 206 through the clevis 200, the axis 206 being a vertical axis.

In the modification of FIG. 3A, the roller 202 is received in the notch 80 of the surface 74 of the radius element 70, earlier described, and shown in FIG. 2.

The hydraulic cylinder assembly 130 has a cylinder housing 138, as seen in FIG. 3A, through the left end of which the piston rod 132 extends to a piston 220, which latter has a restricted tiny motion control port 226 extending therethrough from the left to the right side, the port 226 being open and permitting hydraulic fluid to flow therethrough at a metered rate for permitting shifting of the piston 220 from left to right during hunting cycles of the truck that are not dangerous and of lower cycles per minute. However, it will be seen that the port 226 is sufficiently restricted as to prevent flow therethrough at higher speed so that a resistance to flow therethrough is provided sufficient that truck hunting at higher cycles per minute is effectively damped and resisted while reducing hunting of the truck.

In accordance with this invention, it is desirable that the roller 202 be free to come completely out of the notch 80 when the truck is on a curved track. Therefore, at such times, the piston 220 will be urged to the right in FIG. 3A to an extent such that the piston 220 is no longer in a position for blocking a by-pass passage 230, which latter extends through the housing 138 from a position in which its left-hand side is at a covered position 234 until the piston 220 is moved sufficient that its lefthand side has uncovered the closeable end 238 of the passage way 230 so that hydraulic fluid can then flow from the left side of the piston through the by-pass passage 230 freely to the right side of the piston, thereby reducing the hydraulic damping applied to the piston 220 and roller 202 and the wheel truck 20 until such time as the wheel truck has again reached a straight track section. Once the wheel truck has again reached a straight track section, the piston will be once again moving to the left as the roller 202 moves again into the notch 80 under the influence of a spring 260 extending around the piston rod 132 and bearing against the cylinder housing 138 and engaging a spring retainer flange 262 fixed to the piston 132 and carrying the force of the spring to the piston for urging the roller 202 once more into the notch 80.

The spring 260 also maintains the roller 202 against the curved surface 74 adjacent the notch 80 throughout the time that the truck is on a straight track with the roller 202 out of the notch 80.

During the described movement of the piston 220 to the left as the roller 202 once more goes into its notch 80, the motion of the piston is at first very free because of the by-pass passage 230 permitting oil to flow from the left side of the piston to the right side of the piston.

However, as soon as the piston 220 of FIG. 3A has moved to the left enough to once more close off the closeable end 238 of the by-pass passage 230, then further motion of the piston 220 to the left is made possible only by a weak spring return flow check valve generally indicated at 270 and permitting flow freely through the piston 220 from the left side thereof to the right, but preventing flow therethrough from the right side of the piston to the left side thereof.

The check valve 270 can have a check ball 272 held in place by a very weak spring 274 strong enough to hold the ball 272 in place, but not of a strength for resisting flow through the check valve to any substantially extent.

In the modification of FIG. 3A, it will be seen that the intention is that the hydraulic assembly 130 be placed in a position opposite the notch 80 of FIGS. 1 2. Since there is no lever 100 in the modification of FIG. 3A, there is room for such placement of the hydraulic cylinder assembly 130 by simply moving the bracket 142 until it is in alignment with the notch 80 and the axis 30.

IMPORTANT PARAMETERS

In FIG. 3A, it can be seen that the position of the by-pass passage 230 entrance, or closeable end, 238 is especially selected to be at a position with respect to the left edge of the piston 220, as shown in FIG. 3A, such that the by-pass passage 230 will open at precisely the desired time in the roller climbing of a sidewall of the notch 80 so as to permit piston movement during harmless truck oscillation of very low cycle rate, yet permitting the opening of the by-pass passage 230 and thereby the free-truck-turning at a track curve.

Harmless truck oscillation is to be distinguished from destructive high cycle rate truck hunting.

So the selection of the size of fluid flow capacity of the motion control port 226 is such as to permit piston movement in a harmless truck oscillation range of from a minimum of 0 to a maximum of 1.0 hertz, or 1.0 cycles per second.

However, it is to be understood that importantly beneficial results are achieved if the maximum of truck oscillation permitted is from 0.5 to 2 hertz, which latter is from 0.5 to 2 cycles per second of permitted piston movement before hydraulic releasing through the by-pass passage 230.

The fluid flow capacity of the motion control port 226 is, therefore, such as to permit piston movement and truck movement for the rounding of gradual curves in a track, such as 1 or 2 degree gradual curves without any resisting of truck movement. This is also valuable for permitting truck freedom to pivot when the truck is passing over sidewise wandering, unstraight rails, and yet the size of the fluid flow capacity of the motion control port 226 is sufficient to prevent truck oscillation in the damaging hunting ranges.

ANCHORS

In the modification of FIGS. 1, 2 and 3, the bracket 142 and the pivot assembly 106 can be considered to be portions of a first anchor attaching a stabilizer to the railway car body 140 and, in that sense, the first anchor can be considered to have two parts, the pivot assembly 106, seen in FIG. 2, and the bracket 142, seen in FIG. 3, the stabilizer of FIGS. 1, 2 and 3, being given the numeral 300, which is a general numeral for the entire stabilizer which, therefore, includes all parts disposed between the first anchor parts which are the pivot attachment 106 and the bracket 142 and the second anchor part which is the radius element 70 attached to the bolster 54.

All parts of the stabilizer 300 which are connected between the anchors just described can be considered parts of an intermediate section of the stabilizer generally indicated at 302 in FIG. 2. It is this intermediate section 302 which accomplishes the provision of movement resisting means for substantially resisting movement of the first and second anchors with respect to each other in at least one direction during a period of travel of the railway car on a straight track.

It is also the intermediate section 302 which provides movement-resisting means, represented by the hydraulic cylinder 130, chiefly, and represented in part, also, by roller 84 and the notch 80, which yields to permit the first and second anchors to move with respect to each other in the one direction mentioned above during a period of travel of the railway car on a curved track.

It can be seen that this yielding of the movement-resisting means defined mostly by the hydraulic cylinder assembly 130 is sufficient for allowing the first and second anchors to move with respect to each other in the one direction described to an extent of movement substantially greater than the movement-resisting means, defined mostly by the hydraulic cylinder assembly 130, will permit during a period of straight track travel.

DOUBLE ACTING CYLINDER STABILIZER MODIFICATION

In FIG. 4, a double acting cylinder modification of this invention is shown. In this modification, there is no use of the lever 100, nor roller 84, nor notch 80 of the FIGS. 1–3 modification, and instead, double acting cylinder stabilizer of FIG. 4, shown generally at 400, is directly anchored to the railroad car body and to wheel-truck.

Specifically, the stabilizer 400 comprises a hydraulic cylinder assembly 402 of FIG. 4, which latter comprises a cylinder housing 406 attached to a wheel-truck bolster 54 of FIG. 2 in any suitable place by means of a pivot assembly 410 permitting the pivoting of the cylinder housing 406 about a horizontal axis 412 which extends at a tangent to an imaginary circle having its center on the pivot axis 30 of the wheel-truck 20.

The hydraulic cylinder assembly 400 also has a piston rod 420 slidably extended through one end 422 of the housing 406, the end 422 being the end opposite to the end thereof to which the pivotal attachment assembly 410 is attached.

The piston rod 420 has its outer end connected by clevis 428 to a body attachment bracket 430 by a pivot bolt 434 for rotation about a horizontal axis 436, which latter is parallel to the truck attachment axis 412, the axis 436 being called the body attachment axis 436.

The anchors in the modification of FIG. 4 can now be defined as a first anchor which is a bracket 430 of the stabilizer 400 and a bracket 444 of the pivotal attachment assembly 410, which latter directly connects the pivotal attachment assembly 410 to the truck bolster 54.

In FIG. 4 the hydraulic cylinder assembly 402 has its housing 406 provided with a piston chamber 460 which is divided by a piston 470 into left and right end portions 472 and 474.

The central chamber 460 is separated from left and right end chambers 482 and 484 by walls 486 and 488, respectively, through which latter the piston rod 420 extends, being sealed with respect thereto by O-rings 490.

The piston 470 is fixed to the piston rod 420 in any suitable manner, and the piston 420 is free to slide with respect to the cylinder housing 406 from right to left, although motion of the piston 470 is restrained hydraulically as will be described.

A left to right flow pressure check valve, generally indicated at 500 provides communication from the left side of the piston 470 to the right side thereof for hydraulic fluid whenever the pressure of a spring 502 of the valve 500 is overcome by the pressure of fluid entering a smaller passage portion 506 of a passage 510 of the check valve 500, has sufficient pressure to overcome the spring 502 for forcing a valve disc 516 into open position. This then allows fluid to flow from the left side of the piston to the right side of the piston. Since the right side of the passage 510 is much larger than the smaller left side 506, therefore, once the valve disc 516 is pushed out of place flow will be free through the entire passage 510.

At another place on the piston 470 is a right-to-left check valve 550, identical to the check valve 500, and, therefore, not described in detail with the exception that the disc 556 of the check valve 550 is on the right side of the piston, and the smaller end 558 of the passage 560 of the check valve 550 is also on the right side of the piston, whereby the check valve 550 is for the purpose of permitting flow from right to left through the piston, and in that direction only. The springs of the pressure check valve 500 and 550 are both quite strong, much stronger than used for mere oil return flow purposes as was the case in the earlier described valve 270 of FIG. 3A.

In fact, the springs of the valves 500 and 550 of FIG. 4 are strong enough to substantially prevent all truck oscillation, not only the dangerous and destructive hunting oscillations, but also the lesser oscillations permitted by the passage 226 of FIG. 3A.

However, the springs of the check valves 500 and 550 of FIG. 4 are overcomable by forces applied through the piston rod by the wheel-truck when the wheel-truck has reached a curve track section. When this happens the piston 470 of FIG. 5 will move to the left or right depending upon which direction the track curves.

Such a piston movement will cause an O-ring 580 on the piston 470 to move either to the left until it is opposite a left by-pass groove 584, or else to the right until it is opposite a right by-pass groove 586. The by-pass grooves 584 and 586 are grooves extending parallel to the piston rod 420, preferably, and are disposed in the inner wall of the housing of the cylinder assembly 402, being spaced apart by a non-grooved cylinder wall portion 588, on which the O-ring 580 rests during straight track travel.

The grooves 584 and 586 extend to the right and left sufficiently that a loose fit of the piston 470, with respect to the housing 406, will permit oil to flow past the sides of the piston, and into a groove 584 and 586 freely enough to permit thereafter free turning of the truck at the curve track section without any substantial hydraulic resistance from the stabilizer 400 of FIG. 4.

In addition to the by-pass grooves 584 and 586, the housing 406 has a return flow passage 590 in it which extends completely from the left overflow chamber 582 to the right overflow chamber 484 for passage of fluid through the return flow groove 590 in either direction, so as to permit the necessary motion.

It is important to notice that each separation wall 486 and 488 has a return flow check valve in it at 592 and 594, respectively, each with a weak spring, and permitting flow, respectively, from the left overflow chamber 482 to the left side of the piston in the central chamber 460 as regards the overflow valve 592, and permitting flow through the wall 488 from the overflow chamber 484 through the check valve 584 to the central chamber 460 on the right side of the piston.

As thus described, it will be seen that the two-way hydraulic assembly stabilizer of FIG. 4 provides substantially complete locking of a wheel truck against oscillations during straight track travel.

VELOCITY SENSITIVE VALVE STABILIZER

In FIG. 5 the numeral 600 is used to generally indicate a velocity sensitive valve stabilizer, even though only the piston of the stabilizer 600 is shown in FIG. 5, the remainder thereof being understood by reference to the use of the piston 602 of FIG. 5 in the hydraulic cylinder housings of certain other stabilizers described herein, as will be later illustrated in detail.

In FIG. 5, the stabilizer 600 has a velocity sensitive valve 610 provided with a closing element 614 which can be in the form of a neoprene disc adapted to move from right to left and from left to right on a very weak spring 616, which latter is mounted in an outer wall 618 of the piston 602.

The very weak spring 616 and a closing element 614 are located in a hollow interior portion 620 of the piston 602. The velocity sensitive valve 610 further includes a passage 624 extending completely through the piston from left to right and the hollow interior 620 has a portion of very restricted width 630 extending transversely of the passage 624 and partially located on each side of the valve closing element 614.

The element 614 can, therefore, seat against a valve seat 632 on the left side of the element 614 and against a right valve seat 634 on the right side of the element 614. Each seat 632 and 634 surrounds the passage 624 and is located where the passage 624 joins the left and right sides of the restricted portion 630 of the hollow interior 620.

The piston 602 also has a tiny restricted motion control port 650, as seen in FIG. 5, which latter extends from left to right completely through the piston, joining with the hollow interior 620.

The motion control port 650 serves the same purpose as the motion control port 226 of the piston 220 of the modification of FIG. 3A.

If the piston 600 of FIG. 5, as shown and described, were to be substituted for the piston 220 of FIG. 3A, it would function very well as a substitute in working with the housing of FIG. 3A.

The advantage of having the velocity sensitive valve in the piston in the modification of 3A in place of the valve 270 would be that the wheel-truck could negotiate a very slow curve without wheel wear because fluid can freely pass through the passage 624 of FIG. 5 since the valve would not be seated under such conditions. For example, such a gradual curve might be a 1 degree or 2 degree gradual curve, this result being because of special selection for the strength of the spring 616.

Likewise, the velocity sensitive valve 610 would not seat and would thereby permit flow around it through the passage 624 as the wheel-truck wanders to take care of a side-wise wandering unstraight rail in a track intended to be straight, with the result that wheel wear is eliminated in such a condition.

The velocity sensitive valve 614, however, will seat whenever the pressure through the passage 624 is such as caused by damaging oscillations of the wheel-truck and the piston in hunting ranges.

Another use of the velocity sensitive valve 610 of FIG. 5 is to place it in a piston, such as the piston 470 of FIG. 4, whereby the elements of the piston would be check valves 500 and 550, constructed just as they are in the modification of FIG. 4, but also a velocity sensitive valve, such as the valve 610 of FIG. 5. There would be no passage or motion control port 650, however, and there would be no hollow interior to the resultant piston except a hollow interior similar to the hollow interior 620 of FIG. 5, but of a size only for surrounding the element 614 and spring 616 to permit their function as above described.

The resultant piston, not shown, which would have in it the check valves 500 and 550 of FIG. 4, but also a pressure sensitive valve 610, such as FIG. 5, would have advantages. The advantage would be that even though the pressure check valves 500 and 550 would be too strong to allow low-hertz oscillation beneath the damaging hunting oscillation ranges, yet the wheel-truck would be free to pivot about its axis 30 for freely negotiating a very slow curve, such as a gradual curve of 1 or 2 degrees, or simply the slight curves of a side-wise wandering unstraight rail of a rail section intended to be straight. The velocity sensitive valve 610 would, however, close to prevent dangerous oscillation in the hunting ranges of the truck.

From the hybrid piston just described, one of the pressure check valves 500 or 550 can be subtracted to provide another piston, not shown, useful in a single acting situation, such as where the cylinder is single acting to the effect that two of them are needed, one for clockwise and one for counter-clockwise pkvoting of the truck about the axis 30 in the manner of the right and left stabilizer assemblies of FIG. 6, later described, which are mounted on the right and left sides of the axis 30, and on the top of the wheel-truck bolster 54.

The velocity sensitive valve 610 of FIG. 5 in its various uses can be provided with a design such that its spring 616 is of a strength causing it to close whenever oscillations are above a 1.0 hertz or 1.0 cycle per second frequency.

Expressed in another way, a velocity sensitive valve, such as shown at 610 in FIG. 5, prevents a stabilizer from completely locking as is desirable, especially for certain types of railway cars and certain types of track conditions, or preventing wheel wear under those types of conditions, as described above. So also the piston 602 of FIG. 5 with its velocity sensitive valve and passage or motion control port 650 can be substituted for the piston 220 of FIG. 3A, giving even more complete freedom from resistance to truck pivoting about the axis 30, especially useful for gradual track curves and unstraight sections of track which are intended to be straight.

When the piston of FIG. 5 is used in substitution for the piston 220 in FIG. 3A, it is desirable that the single O-ring 662, shown in FIG. 5, be replaced by multiple O-rings, such as those shown in FIG. 3A at 278, and that the left side of the piston be in the position of the left side of the piston at 220 in FIG. 3A. However, a single O-ring can also be used provided its position with respect to the closeable entrance 238 of the passage 230 is properly positioned.

FIG. 4 shows an example of a single O-ring in proper relationship to by-pass passages with the piston 470 of FIG. 4 functioning because of a sufficient loose fit with the cylinder housing 406 as to allow fluid to pass freely enough, once the O-ring 580 thereof has come to be opposite a by-pass groove 584 or 586.

SECTIONAL BOX STABILIZER MODIFICATION

A sectional box modification of the stabilizer is seen in FIGS. 7 to 9, and generally indicated at 1200. The stabilizer 1200 comprises a sectional box outer housing, generally indicated at 1210 and having an upper section 1212, and a lower section 1214.

The sections 1212 and 1214 each has four walls extending vertically towards the opposite section, respectively, from a top wall 1222 of the top section, and from a bottom wall 1224 of the bottom section of the box.

The side walls on the forward side of the box comprise a forward top side wall 1232, and a forward bottom side wall 1234, which latter are spaced vertically from each other. On the back side of the box the back side walls comprising a box top back side wall 1236 and a box bottom section back side wall 1238 are likewise spaced vertically apart with respect to each other at a point midway between the top and bottom of the box housing.

The right and left end walls of the box housing are identical and the right end wall, shown in FIG. 9, will illustrate the construction.

A box upper section right end wall is shown at 1252 and has two downwardly projecting fingers 1254 which vertically lap with an upwardly extending finger 1260 of the box lower section right end wall 1262.

At the left end 1266 of the outer housing 1210 the upper and lower box sections 1212 and 1214 are constructed similarly to the right end, illustrated in FIG. 9, whereby the lower section 1214 has an upwardly projecting central finger 1268, similar to the finger 1260 of the right end, with the exception that the finger 1266 has a circular recess 1269 in its upper side, receiving slidably therethrough an end portion 1271 of a valve shaft 1276 which extends horizontally through a center of the stabilizer 1200, midway between the top wall 1274 of the upper housing section 1212, and the bottom wall 1275 of the lower housing section 1214, and along a horizontal axis 1280, seen in FIG. 7.

So it is to be understood that the left end of the housing 1210 has two fingers 1282 projecting downwardly, a portion of one of which can be seen in FIG. 8, and which lap the finger 1268 of the lower section 1214 of the housing.

Inside the outer housing 1210 is a hydraulic cylinder assembly, generally indicated at 1290, and having a cylinder housing 1292, which is adapted to reciprocate with respect to a piston, generally indicated at 1294, having O-rings 1296 snugly fitting an inner wall 1298 of the cylinder housing 1292, the piston having a central bore 1299, slidably receiving the valve shaft 1276, which latter has its outer end fixed to the left end of the housing 1292 by a thread and locknut assembly 1302.

The piston 1294 is held in a fixed relationship with respect to the right end of the outer housing 1210 by means of a sleeve 1308 extending horizontally along the axis 1280 and slidably receiving the valve shaft 1276, the sleeve 1308 being held in place by a vertical flange 1310 fixed to a sleeve base 1312, the flange 1310 being sufficiently snugly received in a cavity 1314 in the bottom section 1214 of the outer housing 1210 as to be held in a position for holding the sleeve 1308 along the axis 1280.

In a sense, the sleeve 1308 and the base 1312, with its flange 1310 can all be considered generally to be a valve housing 1320.

The cylinder housing 1492 has a right end wall or inner end wall 1336, fixed thereto and closing its right end or inner end with the exception that the end wall 1336 has an opening 1338, slidably receiving therethrough the sleeve portion 1208 of the valve housing 1320, so that the end wall 1336 reciprocates with the hydraulic cylinder housing 1292 in moving from right to left and from left to right with respect to the piston 1294.

A coil compression spring 1340 extends around the sleeve and base portions 1308 and 1312 of the valve housing 1320, and engages the flange 1310 at one end and the hydraulic cylinder assembly end wall 1336 at its other end so that the spring 1340 tends to resist movement of the hydraulic cylinder assembly housing 1292 toward the flange 1310.

The piston 1294 has in it a pressure check valve assembly 1350 of a kind having a strong spring for allowing passage of hydraulic fluid therethrough from the left side of the piston to the right side of the piston, only at times when its spring pressure is overcome, which latter occurs only when there is a force on the valve 1350 of hydraulic fluid such as would be produced as the wheel-truck on which the stabilizer 1200 is mounted rounds a curve in a track, whereby the strength of the spring of the pressure check valve 1350 is sufficient to prevent hydraulic fluid from flowing therethrough as a result of pressures on the left side of the piston 1294, resultant from mere pivoting forces on the wheel truck during straight track travel.

The piston 1294 has in it also a weak check valve 1360 with a weak spring easily overcome and serving the purpose of permitting flow through the piston from right to left on a return flow basis only for simply permitting fluid to flow back to the left side of the piston 1294.

Between the piston 1294 and the end wall 1336 is a chamber 1370 in which a diaphragm 1372 is mounted, the diaphragm having its circumference fixed to the inner wall 1298 of the housing 1292 by a suitable attachment ring assembly 1380, completely surrounding an outer circumference 1382 of the diaphragm 1372.

Innermost portions of the diaphragm 1372 surround an annular opening 1388 therein, and the diaphragm 1372 has a portion adjacent the opening 1388 slidably receiving the sleeve 1308 therethrough and is attached to the end wall 1336 by an inner sealing ring assembly 1390 in a manner for completely sealing a left portion 1394 of the chamber 1370 from the right portion 1396 thereof, the left portion being adjacent the piston 1294 and the right portion being on the other side of the diaphragm adjacent the end wall 1336.

The sleeve 1308 of the valve housing 1320 has a by-pass passage 1400 extending through it transversely of the axis 1280, but oil cannot pass through the by-pass passage 1400 because an enlarged right end 1402 of the valve shaft 1276 is in the way and tightly, but slidably fits in the sleeve 1308, except at times when the enlarged right end 1402 has moved to the right with respect to the sleeve 1308 sufficiently to be no longer blocking the by-pass passage 1400.

Referring to FIG. 8, it will be seen that a support 1410 extends downwardly from the underside section 1214 of the box housing 1210, and is fixed firmly thereto.

The support 1410 extends downwardly to the bolster 54 of a wheel-truck, exactly like the bolster 54 of FIG. 1, and the support 1410 can be fixed to the bolster 54 in the same manner as is the support 72 of FIG. 1, which latter supports the radius element 70.

As thus described the axis 1280 of the box stabilizer of FIG. 7 will be caused to be disposed at a right angle to a radius of a circle extending in a horizontal plane and having its center on the axis 30 of the wheel-truck.

The upper housing section 1210 is fixed to the underside of the railway car body 12, by welding or other suitable means, as shown at 1416 in FIG. 8.

What is being described is the placing of the stabilizer 1200 of FIGS. 7, 8 and 9 in a position at the top of a support 1410, similar to the support 72 of FIG. 3, except that the support 1410 would be somewhat higher. No other stabilizer would be used on the system, and, of course, the radius element 70 would not be employed.

With this understood, it can be seen that any rotation of the wheel-truck in either clockwise or counter-clockwise direction would cause a shifting of the lower housing section 1214 of FIG. 8 with respect to the upper housing section 1212 thereof, causing the finger 1260 on the lower housing section 1214 to press either the flange 1310 of FIG. 7 to the left, as shown in FIG. 7, or else the cylinder assembly housing 1292 to the right, as shown in FIG. 7. Either of these causes a relative movement of the flange 1310 toward the cylinder housing 1292, forcing the cylinder assembly housing 1292 to the right with respect to the piston 1294 in FIG. 7, which is possible at a railway track curve because the motion control pressure check valve 1350 would be overcome, permitting fluid to flow through the piston from left to right so as to be received between the piston and the diaphragm 1372, causing the latter to unfold and move to the right with respect to the cylinder assembly end wall 1336, although none of the fluid would pass to the right beyond the diaphragm 1372.

Referring now to FIG. 7, it can be seen that the valve shaft 1276 has a left portion 1401 of lesser diameter than the enlarged right end portion 1402. The left end portion 1401 loosely fits the piston bore 1299 and the sleeve 1308.

As soon as sufficient motion of the cylinder housing 1392, and the piston 1294 toward each other has occurred, then the shaft 1276 will have moved sufficiently to allow fluid to travel freely along a loose fit between the valve shaft 1276 and the interior of the sleeve 1308, so as to adequately pass fluid to the by-pass passage 1400, so as to enter the area between the diaphragm and the piston, so that thereafter further movement of the cylinder housing 1292 and the flange 1310 towards each other is hydraulically unimpeded, and the motion is free so that the wheel-truck can freely turn the curved track section.

There is no entrapment of hydraulic fluid on the right side of the by-pass passage 1400 because the sleeve 1308 loosely fits the enlarged right end portion of the valve shaft 1276.

STABILIZER WITH VERTICALLY RECIPROCATING PISTON

Figure 10:
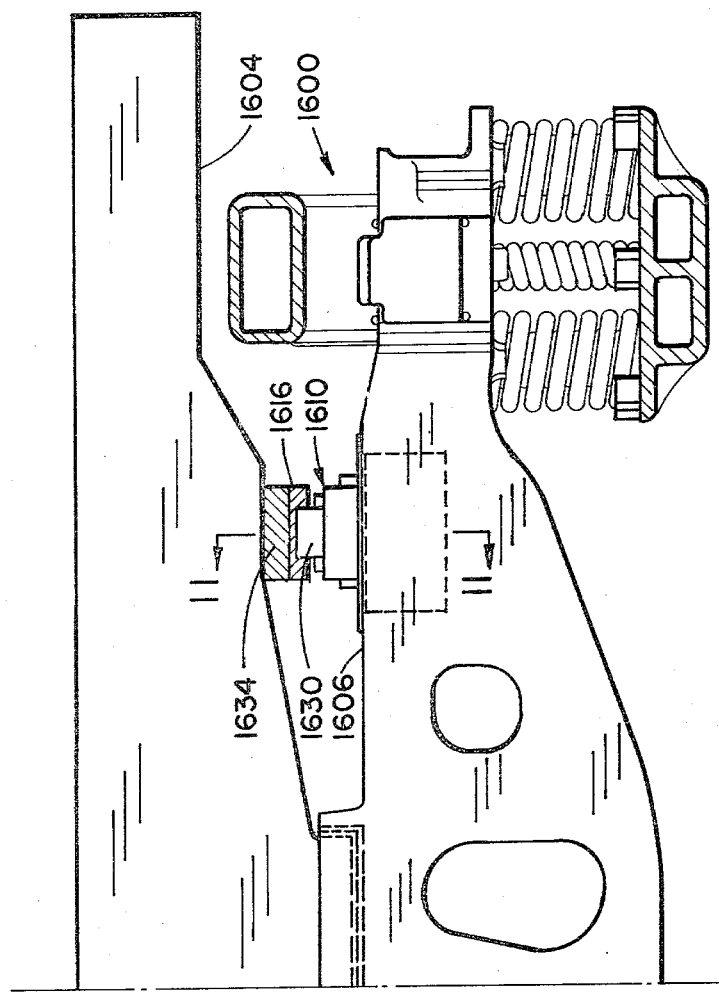
FIG. 10 is a frontal elevation of a railway car, showing a forward wheel-truck bolster thereunder, certain other parts of the wheel-truck attached to the bolster being shown. A vertically reciprocating stabilizer with vertically reciprocating piston and roller mounted in the bolster is shown with the roller in engagement with a notched element mounted on the railway car body with parts shown in position for straight track travel, the notched element and the mounting being shown with the forward half thereof being broken away and the remainder showing in section.

In FIG. 10 a railway car and wheel-truck-releasing stabilizer assembly are generally indicated at 1600, of which the railway car is shown at 1604 and a wheel-truck at 1606.

Figure 11:
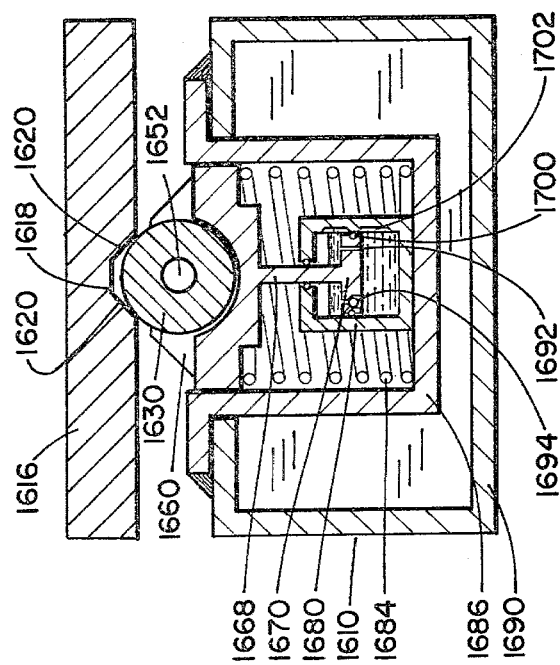
FIG. 11 is a sectional view, taken along the line 11—11 of FIG. 10, showing only the stabilizer with its notched element and its hydraulic cylinder assembly in cross section.

A vertically reciprocating piston stabilizer is generally indicated at 1610 in FIGS. 10 and 11, and comprises a notched element 1616 having a downwardly facing notch 1618 on its underside, provided with diverted surfaces 1620 engaged by a roller 1630.

The notched element 1616 is attached by a mounting member 1634 to the railway car body 1604 on one side thereof from a vertical pivot axis 1640, seen in FIG. 10.

The roller 1630 rotates on a horizontal axis 1652, as carried by a mounting 1660, which latter is connected to a piston rod 1668 of a piston 1670, which latter vertically reciprocates in a hydraulic cylinder housing 1680.

A compression spring 1684 is carried by a frame member 1686, which latter is attached to the wheel truck 1606 directly beneath the notch 1618 by an attachment member 1690.

The spring 1684 presses the mounting 1660 upwardly for urging the roller 1630 upwardly at all times so that it tends to automatically seat itself in the notch 1618 whenever the roller is therebeneath.

The piston 1670 has a motion control port 1692 extending vertically therethrough and of a size such that hydraulic fluid flow therethrough cannot be rapid, but is sufficient to permit the piston to vertically reciprocate sufficiently to permit harmless low-cycle rate reciprocations by restricting flow therethrough so much that the piston is hydraulically restrained from defining higher cycle rate reciprocations of the sort that accompany the destructive hunting oscillations of the wheel-truck, whereby the latter are prevented hydraulically. A return flow check valve having a weak spring is shown at 1694, and serves to allow fluid to pass from the upper side of the piston 1670 to the lower side thereof, so as to permit the piston to move upward under the urging of the spring 1684 after the wheel-truck has entered a straight track section again after leaving a curved track section, so that the roller 1630 can once again nest into the notch 1618.

So the roller 1630 is in the notch 1618 during straight track travel, but can come out of the notch when the wheel truck rounds a curve, because the piston 1670 will then have moved downwardly sufficiently that the O-ring 1700 will have become opposite a by-passage or cylinder wall groove 1702, which latter extends upwardly and downwardly in the hydraulic cylinder housing inner surface. The piston 1670 can have a sufficiently loose fit that whenever its O-ring 1700 is opposite the groove 1702, whereby sealing is broken, then flow from the bottom side of the piston to the top side of the piston will occur freely, so that the roller 1530 comes freely out of the notch 1618 to allow the wheel-truck to round a curve without hydraulic resistance. The resistance afforded by the spring 1684 is very little and the spring 1684 is only strong enough to serve the purposes of the return of the roller 1630 to the notch 1618 in order to set the parts once more in a position for the hydraulic resistance, provided by the motion control groove 1692.

The construction of the piston 1670 can, therefore, be of the same dimensions as those of the piston 220 of FIG. 3A for accomplishing the same purposes.

SQUEEZING FRAME STABILIZER WITH SINGLE ACTING PISTON

In FIG. 5A a squeezing frame stabilizer with single acting piston is generally indicated at 1500, and comprises a squeezing frame, generally indicated at 1510, having an upper part 1512 and a lower part 1514. The upper frame part 1512 has a vertical section 1516, and horizontal section 1518, which latter is attached to a car body of a railway car disposed there above and not shown in FIG. 5A. The lower frame section 1514 has a horizontal portion 1522, and a vertical portion 1524. The horizontal portion 1522 is fixed to the upper side of the bolster 1528 of a wheel truck, generally indicated in FIG. 6 at 1530.

The vertical sections 1516 and 1524 are planar on their inwardly facing sides 1536 and 1538. The stabilizer 1500 is mounted on the bolster 1528 in a manner such that the planar surfaces 1536 and 1538, both of which are vertical, are disposed in vertical plane substantially parallel to a horizontal axis 1534, which extends along the top of the bolster 1528, through the pivot axis 1538 of the wheel-truck 1530, the horizontal axis 1534 extending directly from right to left under a railway car when travel is on a straight track. The railway car is generally indicated at 1540 in FIG. 6, although its body is not shown.

In FIG. 5A it will be seen that the hydraulic cylinder assembly 1542 has a cylinder housing 1544 disposed with one end against the surface 1536, the assembly 1542 having an enlarged end 1548 of its piston 1550 disposed against the surface 1538 with a relatively weak return spring 1554', disposed between the end 1548 and the cylinder housing 1544, the spring 1554' preferably being of the conical type so that is is of a minimum size when fully compressed because of a nesting of its coils one within the other.

The assembly 1542 has a piston 1554 of a single acting sort, having a pressure check valve 1560 extending therethrough for permitting flow of hydraulic fluid from the right to the left only when its spring is overcome, and that happens only when the force on the fluid applied by the wheel truck is sufficient to indicate that the wheel-truck is turning a curve in the track, since the spring of the check valve 1560 is strong enough to keep the valve sufficiently closed to prevent wheel hunting oscillations of the wheel-truck.

A return flow check valve 1570 with a weak spring extends through the piston, allowing passage of fluid from the left to the right therethrough, but not from the right to the left. A reservoir 1572 is disposed in communication with the left side of the piston through a port 1574 to allow fluid to escape into the reservoir 1572 from the left side of the piston. The port 1574 is a motion control port.

The valve 1560 will be described in greater detail in connection with the detailed views in FIGS. 14 and 15 in a later section hereof titled: PRESSURE CHECK VALVES WITH BY-PASS PASSAGES.

In FIG. 6, it will be seen that when the same stabilizer 1500 of FIG. 5A is placed on the right side of the axis 1538 and mounted similarly with its lower frame section 1514 fixed to the bolster 1528 and its upper frame section 1518 portion fixed to the railway car body, then the right hand side stabilizer 1500 will resist clockwise motion of the wheel-truck 1530 at the same time that the left side stabilizer 1500 is resisting the counter-clockwise motions of the wheel-truck 1530.

It can be seen that the upper frame section 1512 of FIG. 5A serves as one anchor of the stabilizer 1500, and the lower frame section 1534 serves as another anchor of the stabilizer 1500 and these two sections slide with respect to each other freely as described.

LEAF-SPRING CAM-ACTION STABILIZER

Figure 12:
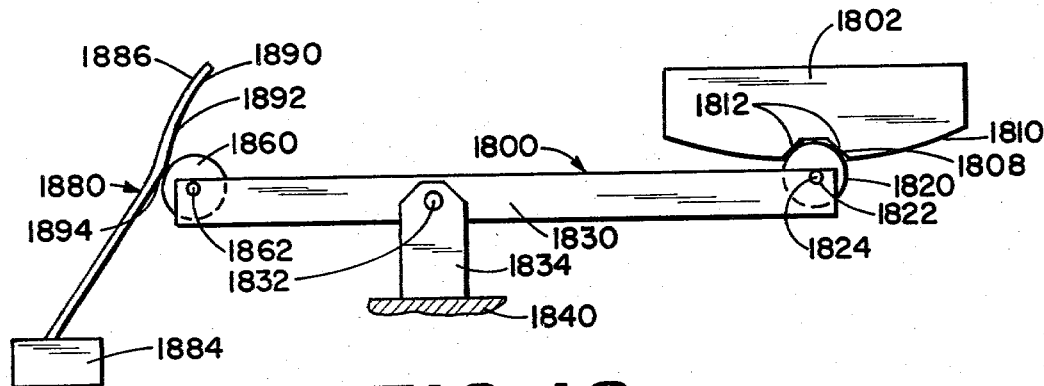
FIG. 12 is a side elevation of a leaf-spring cam-action stabilizer modification, showing parts which anchor the stabilizer to the wheel-truck and railway car body, although the truck and car body are not shown.

In FIG. 12 a leaf-spring cam-action stabilizer if generally indicated at 1800. A radius member 1802 which is mounted on a wheel-truck similarly to the radius member 70 of FIG. 2, and has a notch 1808 facing away from the pivot axis of the wheel-truck, best seen in FIG. 1 at 30. The notch 1808 is in a curved surface 1810 in a cylindrical configuration, having its axis at the axis of the wheel-truck 30 of FIG. 1, and the notch 1808 extends vertically, having divergent surfaces 1812 engaged by a roller 1820, mounted by a member 1822 so as to roll about a vertical axis 1824, disposed at one end of a lever arm 1830, which pivots about a central pivot axis 1832, because of a pivotal mounting 1834, to which it is connected, the latter being attached to a railway car body by any suitable member 1840, only a part of which is shown in FIG. 12.

At the left end of the lever 1830 is a spring engaging roller 1860 mounted for rotation with respect to the lever 1830 about an axis 1862 which latter extends vertically in parallelism and substantial alignment with the axis 1832 and 1824.

The roller 1860 engages the leaf-spring 1880, having one end attached by an anchor 1884 to the underside of a railway car body, not shown.

The leaf-spring 1880 has an offset portion 1886, having an offset surface 1890, which faces in the general direction of the roller 1860, and which is disposed in a position farther from the anchor 1884 than inner parts of the spring 1880. The spring 1880 has an inclining surface 1892, which inclines away from the fulcrum axis 1832, more so than a surface 1894 of the side of the spring 1880 which faces the roller 1860, which latter surface portion 1894 is engaged by the roller 1860 at times when the wheel-truck of the railway car is exactly at a right angle from right to left across under the railway car, because the track is exactly straight.

And so because the leaf-spring 1880 has an unusual shape with its offset portion 1886, it can be called a cam-action leaf-spring, and by proper choice of the exact shape of the offset surface 1890, and the curved surface 1892, and of the strength of the spring, and of the angle at which the spring is disposed at with respect to the imaginary line between the roller axes 1824 and 1862, one cam causes the spring to do a good job of resisting truck rotation, including the damaging hunting oscillations, but yet causes the full power of the spring to cease to be applied and to be released as the wheel-truck turns at a curve, forcing the notched member 1802 to move to the right or left, as seen in FIG. 12, whereby the roller 1820 is forced out of the notch, causing the lever 1830 to carry the roller 1860 past the curved section 1892 and opposite the offset surface 1890, where the resistance of the spring is much less to allow the wheel-truck to round the curve more freely and with much lesser resistance from the spring 1880.

Figure 13:
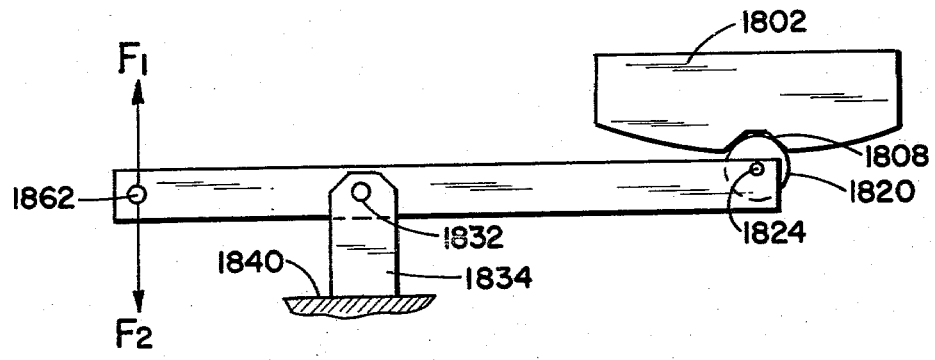
FIG. 13 is a general diagram showing a rocking lever of the body mounted fulcrum type with a notch-engaging roller at one end received in a notched element for truck mounting.

Referring now to FIG. 13, the same construction is there shown, with the exception that the roller 1860 and spring are not shown so that the general principles of the lever and notch-engaging roller 1820 can be discussed. It will be seen that at the left end of the lever it is the amount of force working counter-clockwise on the lever at F2 that resists hunting rotation of the wheel-truck. Those hydraulic modifications of this invention which accomplish a complete releasing by means of a by-pass line have the advantage, however, over the spring 1880, because they permit the left end of the lever to move freely in the direction F1, so that the wheel-truck does not have to fight a force at F2 in order to get the roller out of the notch 1808, so as to be able to round the curve. To the extent the force F2 remains in operation after the roller 1808 has made some substantial movement toward climbing out of the notch, then to that extent the wheels of the wheel-truck will experience a wear on their engagement with the rails horizontally because of the force at F2.

PRESSURE CHECK VALVES WITH BY-PASS PASSAGES

Figure 14:
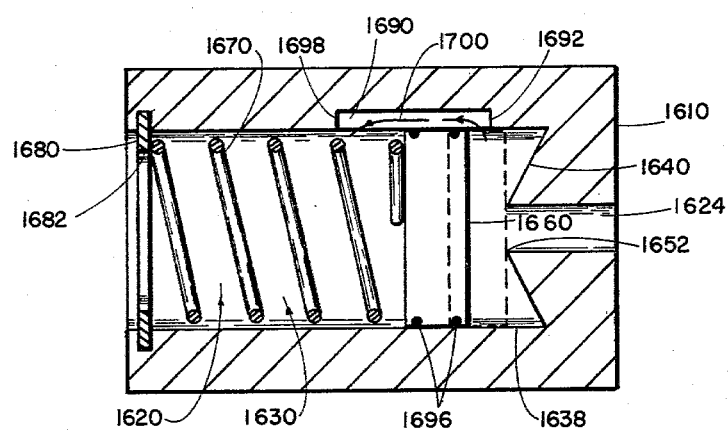
FIG. 14 is a side elevation of a valve with the forward half removed and its parts shown in section with the exception of its closing disc, the valve being of the type useable in the upper valve position in the stabilizer modification of FIG. 5A, and being of a cylindrical inner wall type with a by-pass groove.
Figure 15:
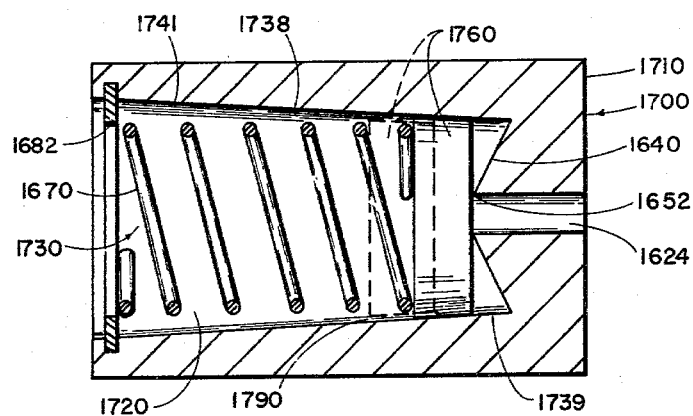
FIG. 15 is a valve of a frustro-conical inner wall type for permitting by-pass, the valve being shown in side elevation with the foward half removed and parts showing in section with the exception of the closure disc, this valve also being useable in a position such as in the upper valve position in the FIG. 5A stabilizer modification.

In FIGS. 14 and 15 are two modifications of pressure check valves having by-pass passages, specifically a valve 1600 of FIG. 14 and valve 1700 of FIG. 15.

The valves 1600 and 1700 can be mounted in a piston 1610 or 1710, respectively, and the latter pistons can be a substitute for the piston 1554 of FIG. 5A, and with the valves 1600 or 1700 used as substitutes for the valve 1560 of FIG. 5A.

In FIG. 14, the piston 1610 can be seen to have a valve port, generally indicated at 1620, the port 1620 having two major portions, the first major portion being a smaller entry portion 1624, which latter extends from right to left, as shown, and which has a least vertical cross-sectional area much lesser than the least vertical cross-sectional area of a larger exit portion 1630 of the total valve port 1620.

The larger exit portion 1630 can have a generally cylindrical outer wall 1638 closed by an inclined end wall 1640, which latter is at the right end of the larger exit portion 1630 and surrounds the smaller entry portion 1624 of the port 1620.

The wall 1640 protrudes to the left where it surrounds the smaller entry port portion 1624 for providing a circular edge 1652, against which a valve closing member, or valve disc 1660, seats, when it is in the seating position shown in dotted lines in FIG. 14.

The wall 1640 inclines back to the right on all sides of the entry portion 1624, and is, therefore, preferably of a frustro-conical shape, and the circular edge 1652 is known in the prior art as being useful for good valve seating with concentrated pressure.

As the valve closure or disc 1660 moves to the right under pressure, it will compress the springs 1670, disposed between the closure or disc 1660, and a support ring 1680, which latter has an opening 1682 through it of a diameter almost as large as the diameter of the cylindrical wall 1638.

In FIG. 14 a by-pass passage is seen at 1690 in the form of a groove in the wall 1638, the groove 1690 having a right edge 1692, which is opposite the disc 1660 when the latter is in the closed dotted line position so that the disc 1660 then laps across the right edge of the groove, so that the right end of the groove 1690 is sealed, because the piston 1660 makes a tight sliding fit with the outer cylindrical wall 1638, in which it moves, especially so because of the O-rings 1696, surrounding the disc 1660.

The left end of the groove 1660 terminates in a wall 1698, which is on the left side of the position that the disc 1660 is in when it is a maximum open position against the pressure of the spring 1670 under the force of fluid coming through the entry portion 1624, under the pressure created by the turning of the wheel-truck around a curve when the valve 1600 is used in a piston, such as in substitution for the valve 1560 of FIG. 5A.

As thus described the fluid can flow in the direction of the arrows 1700 around the disc 1660 when the disc is in the open position, shown in full lines in FIG. 14.

If the strength of the spring 1670 is chosen to be at a certain strength in proportion to the cross-sectional area of the smaller entry port portion 1624 and in proportion to the area of the right side of the disc 1660, then it can be that only a minute portion of the amount of pressure required to open the valve by forcing the disc 1660 away from the narrow circular edge 1652 will be required to hold it open. This is because once the disc has moved away from the edge 1652, then the fluid will be applied across the whole right side of the disc and if the entry portion 1624 is very, very small, the amount of area of the disc effected by the pressure when the disc is closed is tiny indeed compared to the amount of pressure involved after the disc has moved sufficiently that the fkyud oressyre can get at and be applied across the entire right side area of the disc 1660.

This is true, even though the pounds per square inch against the entire right side of the disc would be lesser than against the small portion of the disc which receive force when it is closed, yet the area of the disc effected when it is open will be so much larger as to have a greatly multiplying effect.

The size of the groove 1690 can be such that when fluid is by-passing through it the wheel-truck involved will be substantially completely free to turn its curve without resistance from the hydraulic system.

Very little truck rotation and very little motion of the closing member 1660 and of the piston in which it is contained is needed to open the valve 1600. When it is not open the system is substantially locked and the wheel-truck is substantially prevented from rotating about its vertical axis.

The valve 1600 of FIG. 14 could also function if there were no grooves 1690 and if the disc 1660 simply had a loose enough fit in the outer wall 1638 so as to permit by-passing around the disc 1660 when the disc is in an open position. But such functioning would have its limitations. For example, the temperature of oil woulc vary the viscosity of the oil, and with certain dimensions a mere loose fit would not be sufficient.

It is also important that the area of the groove 1690 in cross-section, or the area of any loose fit around an open disc, if a simple loose fit in a wall 1638 is used without a groove 1690, be such that the area made available by either of these two methods for by-passing fluid around a disc be an area which is somewhat smaller than the area of the entry portion 1624 of the port 1620. This is because if the cross-sectional area for by-passing the disc 1660 is larger than the cross-sectional area of the entry portion 1624 of the port 1660, then chatter may occur.

Referring to FIG. 15 a further modification of a pressure check valve having a by-pass passage system is there shown at 1700, and a piston 1710 which is otherwise the same as the piston 1610 of FIG. 14.

The valve 1700 has an outer wall 1738 for receiving a disc 1760, the outer wall 1738 being frustro-conical with a first end of smaller diameter at its right end, as shown at 1739, with the wall 1738 tapering to a left end of larger diameter, seen at 1741.

The valve port of the valve 1700 is seen at 1720, and has its larger exit portion 1730 receiving a spring 1670.

The valve 1700 has a smaller entry port portion 1624, similar to the valve 1600, and there is a tapered surface 1640 terminating in a circular thin edge 1652, as in the valve 1600.

The disc 1760 can fit the wall 1738 closely when the disc 1760 is in a seated position but this is not vital. It is important, however, that the disc 1760, when it is in an open position, shown in dotted lines in FIG. 15, be spaced from the wall 1738 sufficiently to provide an annular by-pass passage or area 1790, between the disc 1760 and the wall 1738, which is of a size for meeting the by-pass area requirements above described.

Operation of the valve 1700 is otherwise similar to the operation of the valve 1600 as previously described, except that the by-pass area 1790 substitutes for the by-pass groove 1690 of the valve 1600.

SIZE COMPUTATIONS

Hydraulic engineers are commonly skilled enough to easily select a relief valve to provide a desired resistance in a given cylinder size.

The factors that determine the amount of force that should be made available to hold a wheel-truck from oscillation are also factors that are commonly understandable and easily observed by hydraulic engineers for the purposes hereof. It is, therefore, believed that the calculations needed to practice this invention are within the common skill of the average hydraulic or mechanical engineer.

The force required to prevent a wheel-truck from turning or hunting can be easily determined, I believe, by a man of average skill in this art, by using the method I used myself, namely, using a set-up such as shown in FIG. 2, on a railway car, but by using an ordinary simple hydraulic cylinder, not shown, in place of the special cylinder 130, and with the hydraulic force applied in the cylinder provided from any source through a variable valve and a pressure gauge.

The force required to prevent a wheel-truck from turning can also be easily determined by a man of average skill in this art by use of a common spring-scale applied at F2 in FIG. 13 or directly between a wheel-truck and car body.

The "input forces" on a truck which cause hunting involve many forces, affected by many factors, for example: type of car structure and flexing; length of car; weight of car; rail impact, which can vary between ribbon and jointed rail; wheel contour; wheel tread wear, etc. Such forces can be determined by testing on known test equipment.

A testing machine, such as the M.T.S. brand is very useful in dimensional design of the parts of this invention. An M.T.S. machine is a machine commonly used in industry for many other tests of products which tests require cycling, fatigue testing is one example. The M.T.S. machine can be bought at: Materials Testing Systems Co., Minneapolis, Minn.

The size factors that affect operation of pressure check valves such as spring strength, orifice shape and size, valve shape, seat shape, etc., are all well known to average engineers and persons killed in this art, as are also the minimum forces at which different pressure check valves will open.

Therefore, the selection of a pressure check valve seems within the skill of the average person skilled in this art, provided he knows the requirements of the valve, which latter he can determine by considering the following factors, for example: the radius from the truck pivot axis at which a hydraulic cylinder of FIGS. 4, 5A, 6 and FIG. 11 are attached; the radius from the truck pivot axis at which the curved surface 74 of FIG. 2 is located; the radius position and shape of the wall of the notches 80, 1618, and 1808; the radius of any notch-received roller such as the rollers 84, FIGS. 1 and 2; 1630, FIGS. 10 and 11; 1820, FIGS. 12 and 13; the lever 50, FIGS. 1 and 1830, FIG. 12; the distances between the axes of a lever such as the axes 86, 102 and 120 of FIG. 2; the size of the piston 220 of FIG. 3A and of the pistons of the other figures, etc.

Thus the force F2 of FIG. 13 for a given type of railway car under a given load can be computed.

A hydraulic cylinder designed according to computations involving known factors listed above can then be put into a testing machine, such as the M.T.S. machine, adjusted to the conditions of actual use on a railway car and tested. By trial and error, "cut and try" change and try again, the spring pressure at the pressure check valve, (or the permitted movement, permitted by the FIG. 3A passage 226—or by the flow through the passages 560 and 624 of FIG. 5, before the valve 614 closes) can be determined. Fluid viscosity affects such flow. The greater the viscosity, the less large the passages need be for a same effect.

Lastly, the finished cylinder can be actually tested on a railway car of the class it is to be designed for and finishing development done by trial and error, change and test again, the familiar engineering method.

The leaf-spring size and shape computations for the spring modification of FIG. 12 are calculable and "trial and error testable", similar to the above-listed calculations, but involve such other factors as: the angle of the spring 1880 with respect to the lever 1830 of FIG. 12; and the vector relationship of changing forces applied by the spring 1880 on the lever 1830, as indicated by an average force F2 of FIG. 13.

I claim:

1. An oscillation restraint device for a railway vehicle including a vehicle body and a wheel truck rotatable with the body, said device comprising:
   means for automatically hydraulically locking the wheel truck so as to prevent substantially all oscillations of the wheel truck when the wheel truck is positioned in a first range of orientations;
   means for automatically disengaging the locking means and thereby permitting wheeel truck rotation when the wheel truck is positioned in a second range of orientations, distinct from the first range of orientations; and
   means for overriding the locking means and thereby permitting wheel truck rotation when forces tending to rotate the wheel truck exceed a predetermined value.

2. The device of claim 1 wherein the locking means comprises a fluid filled hydraulic cylinder and a piston disposed within the cylinder, and the cylinder and piston are coupled to the body and wheel truck so that rotation of the truck causes the piston to move within the cylinder.

3. The device of claim 2 wherein the disengaging means comprises a bypass passage which permits fluid to pass from one side of the piston to the other when the piston is in a predetermined range of positions.

4. The device of claim 3 wherein the overriding means comprises a pressure relief valve which opens to permit fluid to travel from one side of the piston to the other.

5. An oscillation restraint device for a railway vehicle including a vehicle body and a wheel truck rotatable with the body, said device comprising:
   a cylinder mounted on a first member of the vehicle;
   a piston disposed within the cylinder to divide the cylinder into first and second chambers and coupled to a second member of the vehicle such that rotation of the wheel truck with respect to the vehicle body causes the piston to move along the interior of the cylinder;
   a fluid contained in the cylinder;
   bypass passage means interconnecting first and second portions of the cylinder such that fluid is free to travel between the first and second chambers when the wheel truck is oriented in a first predetermined range of positions yet fluid is substantially prevented from traveling through the bypass passage between the first and second chambers when the wheel truck is oriented in a second predetermined range of positions; and
   pressure relief valve means which open at a predetermined pressure to permit fluid to flow between the first and second chambers, said valve means cooperating with the cylinder, piston, and bypass passage means when the wheel truck is oriented in the second predetermined range of positions to substantially block the movement of fluid between the first and second chambers and thereby to hydraulically lock the wheel truck so as to substantially prevent all wheel truck oscillations when the valve means is closed.

6. An oscillation restraint device for a railway vehicle including a vehicle body having a longitudinal axis substantially parallel with the direction of travel of the vehicle over substantially straight track and a wheel truck, said device comprising:
   a cam surface mounted on a first member of the vehicle, said cam surface defining a recessed section and a shoulder section, adjacent the recessed section;
   a cam follower resiliently mounted on a second member of the vehicle so as to move across the cam surface as the wheel truck rotates with respect to the vehicle body, such that the cam follower is positioned in the region of the recessed section when the wheel truck is oriented to travel substantially in the direction of the longitudinal axis and the cam follower is caused to move with respect to the second member as the wheel truck rotates;
   means for biasing the cam follower against the cam surface; and
   means for resisting the movement of the cam follower with respect to the second member in at least one direction, said resisting means acting to apply a greater resistance to the motion of the cam follower when the wheel truck is oriented to travel substantially in the direction of the longitudinal axis and the cam follower is positioned in the region of the recessed section that when the wheel truck is oriented to travel in a direction angled from the longitudinal axis and the cam follower is positioned in the region of the shoulder section.

7. The device of claim 6 wherein the resisting means comprises:
   a hydraulic cylinder containing a fluid;
   a bypass passage extending from a first portion of the cylinder to a second portion of the cylinder;
   a piston coupled to the cam follower so as to cause the piston to move within the cylinder as the cam follower moves with respect to the second member, the piston being positioned in the cylinder such that fluid is substantially prevented from flowing from one side of the piston to the other through the bypass when the wheel truck is oriented to travel substantially in the direction of the longitudinal axis and fluid is allowed to flow from one side of the piston to the other through the bypass passage when the wheel truck is oriented to travel in a direction angled from the longitudinal axis.

8. The device of claim 7 wherein the resisting means further comprises a flow passage which permits fluid to flow from one side of the piston to the other side of the piston at a metered rate.

9. The device of claim 7 wherein the resisting means includes a check valve which opens to permit fluid to flow from one side of the piston to the other when the fluid pressure on one side of the piston exceeds a predetermined level.

10. An oscillation restraint device for a railway vehicle including a vehicle body and a wheel truck adapted to rotate with respect to the body so as to travel on both straight and curved sections of track, said device comprising:
- a cam surface mounted on a first member of the vehicle, said cam surface defining a recessed section and a shoulder section adjacent the recessed section;
- a cam follower resiliently mounted on a second member of the vehicle so as to move across the cam surface as the wheel truck rotates such that the cam follower is positioned in the region of the recessed section when the wheel truck is oriented for travel on substantially straight track and the cam follower is caused to move with respect to the second member as the wheel truck rotates;
- means for biasing the cam follower against the cam surface;
- cylinder means including a cylinder and a piston which are coupled to the cam follower and the second member such that rotation of the wheel truck causes the piston to move inside the cylinder, the piston serving to divide the cylinder into a first and second chamber;
- a fluid contained in the cylinder;
- a first passage which allows fluid to flow at a metered rate between the first and second chambers; and
- a second passage which allows fluid to flow between the first and second chambers when the wheel truck is oriented to travel on curved track and the cam follower is positioned in the region of the shoulder section but through which substantially no fluid passes between the first and second chambers when the wheel truck is oriented to travel on substantially straight track and the cam follower is positioned in the region of the recessed section.

11. An oscillation restraint device for a railway vehicle including a vehicle body and a wheel truck rotatable with the body for travel on both straight and curved sections of track, said device comprising:
- a cylinder mounted on a first member of the vehicle;
- a piston disposed within the cylinder to divide the cylinder into first and second chambers and engaged with a second member of the vehicle such that rotation of the wheel truck with respect to the vehicle body causes the piston to move along the interior of the cylinder;
- a fluid contained in the cylinder;
- a bypass passage connecting a first portion of the cylinder to a second portion of the cylinder, which passage is placed such that fluid is free to travel through the bypass passage between the first and second chambers when the wheel truck is oriented in a first range of positions appropriate for travel over curved sections of track, yet fluid is substantially prevented from traveling through the bypass passage between the first and second chambers when the wheel truck is oriented in a second range of positions appropriate for travel over substantially straight sections of track; and
- valve means, placed between the first and second chambers, for passing fluid at low velocity between the first and second chambers while substantially preventing high velocity flow therebetween.

12. The device of claim 11 further comprising a cam surface coupled to the piston and having a contour adapted to cause the piston to move a greater distance within the cylinder for wheel truck rotation encountered during substantially straight track travel than for wheel truck rotation encountered during curved track travel.

13. In an oscillation restraint device for a railway vehicle including a vehicle body and a wheel truck rotatable with respect to the body, said wheel truck arranged to support a single vehicle body, the improvement comprising:
- means for automatically hydraulically locking the wheel truck so as to prevent substantially all oscillations of the wheel truck when the wheel truck is positioned in a first range of orientations;
- means for disengaging the locking means and thereby permitting wheel truck rotation when the wheel truck is positioned in a second range of orientations distinct from the first range of orientations; and
- means for overriding the locking means and thereby permitting wheel truck rotation when forces tending to rotate the wheel truck exceed a predetermined value.

14. In an oscillation restraint device for a railway vehicle including a vehicle body and a wheel truck rotatable with respect to the body, said wheel truck arranged to support a single vehicle body, the improvement comprising:
- a cylinder mounted on a first member of the vehicle;
- a piston disposed within the cylinder to divide the cylinder into first and second chambers and coupled to a second member of the vehicle such that rotation of the wheel truck with respect to the vehicle body causes the piston to move along the interior of the cylinder;
- bypass passage means interconnecting first and second portions of the cylinder such that fluid is free to travel between the first and second chambers when the wheel truck is oriented in a first predetermined range of positions yet fluid is substantially prevented from traveling through the bypass passage between the first and second chambers when the wheel truck is oriented in a second predetermined range of positions; and
- pressure relief valve means which open at a predetermined pressure to permit fluid to flow between the first and second chambers, said valve means cooperating with the cylinder, piston, and bypass passage means when the wheel truck is oriented in the second predetermined range of positions to substantially block the movement of fluid between the first and second chambers and thereby automatically to hydraulically lock the wheel truck so as to substantially prevent all wheel truck oscillations when the valve means is closed.

15. An oscillation restraint device for a railway vehicle including a vehicle body and a wheel truck rotatable with respect to the body, said device comprising:
- a hydraulic cylinder mounted on a first member of the vehicle;

a piston disposed within the cylinder to divide the cylinder into first and second chambers and coupled to a second member of the vehicle such that rotation of the wheel truck with respect to the vehicle body causes the piston to move along the interior of the cylinder;

a substantially incompressable hydraulic fluid contained in the cylinder;

bypass passage means interconnecting first and second portions of the cylinder such that fluid is free to travel between the first and second chambers when the piston is in a first predetermined range of positions, corresponding to truck orientation for travel along curved track, and fluid is substantially prevented from traveling through the bypass passage between the first and second chambers when the piston is in a second predetermined range of positions, corresponding to truck orientation for travel along substantially straight track;

a first pressure relief valve disposed within the piston to pass fluid from the first chamber to the second chamber when the pressure in the first chamber exceeds a predetermined value;

a second pressure relief valve disposed within the piston to pass fluid from the second chamber into the first chamber when the pressure in the second chamber exceeds a predetermined value;

said piston, cylinder, fluid, bypass means and first and second valves automatically cooperating to substantially block the flow of fluid between the first and second chambers when the piston is in the second predetermined range of positions, and thereby to hydraulically lock the wheel truck so as to substantially prevent all wheel truck oscillations when the first and second valves are closed.

* * * * *

UNITED STATES PATENT AND TRADEMARK OFFICE
CERTIFICATE OF CORRECTION

PATENT NO. : 4,228,741
DATED : October 21, 1980
INVENTOR(S) : Frank D. Bruner

It is certified that error appears in the above-identified patent and that said Letters Patent are hereby corrected as shown below:

Column 1, line 68, please delete "and" immediately after "eliminating";

Column 19, line 33, please delete "by-passage" and insert therefor --by-pass passage--;

Column 20, line 18, please delete "is is" and insert therefor --it is--;

Column 23, line 8, please delete "fkyud oressyre" and insert therefor --fluid pressure--;

Column 25, line 36, please delete "wheeel" and substitute therefor --wheel--;

Column 26, line 17, please insert --automatically-- immediately after "thereby";

Column 26, line 63, please insert --passage-- immediately after "bypass";

Column 30, line 11, please insert --passage-- immediately after "bypass".

Signed and Sealed this

Tenth Day of February 1981

[SEAL]

Attest:

RENE D. TEGTMEYER

Attesting Officer

Acting Commissioner of Patents and Trademarks

Disclaimer 4,228,741.—*Frank D. Bruner*, Omaha, Nebr. AUTOMATICALLY RELEASING STABILIZER. Patent dated Oct. 21, 1980. Disclaimer filed Sept. 14, 1983, by the assignee, *Paxton & Vierling Steel Co.*

Hereby enters this disclaimer to claim 15 of said patent.

[*Official Gazette December 6, 1983.*]